US011677485B2

(12) United States Patent
Williams et al.

(10) Patent No.: US 11,677,485 B2
(45) Date of Patent: *Jun. 13, 2023

(54) NETWORK DEVICES, METHODS AND/OR SYSTEMS FOR USE IN A MEDIA NETWORK

(71) Applicant: Audinate Pty Ltd., Ultimo (AU)

(72) Inventors: Aidan Williams, Chifley (AU); Varuni Witana, Kings Langley (AU); James Westendorp, Maroubra (AU); Andrew White, Ingleburn (AU)

(73) Assignee: Audinate Holdings Pty Limited, Ultimo (AU)

( * ) Notice: Subject to any disclaimer, the term of this patent is extended or adjusted under 35 U.S.C. 154(b) by 0 days.

This patent is subject to a terminal disclaimer.

(21) Appl. No.: 15/279,000

(22) Filed: Sep. 28, 2016

(65) Prior Publication Data
US 2017/0019201 A1 Jan. 19, 2017

Related U.S. Application Data

(63) Continuation of application No. 12/735,925, filed as application No. PCT/AU2009/000253 on Mar. 2, 2009, now Pat. No. 9,497,103.

(30) Foreign Application Priority Data

Feb. 29, 2008 (AU) .............................. 2008901020

(51) Int. Cl.
*H04J 3/06* (2006.01)
*H04L 45/02* (2022.01)
*H04L 69/28* (2022.01)
(52) U.S. Cl.
CPC .......... *H04J 3/0632* (2013.01); *H04J 3/0638* (2013.01); *H04J 3/0664* (2013.01); *H04J 3/0673* (2013.01); *H04L 45/02* (2013.01); *H04L 69/28* (2013.01)

(58) Field of Classification Search
CPC ................... H04W 56/0015; H04J 3/06–0697
See application file for complete search history.

(56) References Cited

U.S. PATENT DOCUMENTS 5,682,384 A    10/1997  Zarros
6,175,604 B1   1/2001   Noro et al.
(Continued)

FOREIGN PATENT DOCUMENTS

EP    1148687    10/2001
EP    1398931    3/2006
(Continued)

OTHER PUBLICATIONS

Mills, David L., "Network Time Protocol (Version 3) Specification, Implementation and Analysis", 80 pps, University of Delaware, Mar. 1992.
(Continued)

*Primary Examiner* — Pao Sinkantarakorn
(74) *Attorney, Agent, or Firm* — Jones Day

(57) ABSTRACT

In certain aspects, the present disclosure is related to devices, methods, systems and/or computer-readable media for use in an isochronous media network in which media devices connected to a network employ one or more synchronization signal to regulate or facilitate the transmission of media signals through the network. In certain aspects, the present disclosure is also related to devices, methods, systems and/or computer-readable media for use in a larger unified, or substantially unified, isochronous network created from aggregating local isochronous media networks in which media devices connected to a network employ a one or more synchronisation signal distributed from a local master clock to regulate or facilitate the transmission of media signals.

10 Claims, 11 Drawing Sheets

(56) References Cited

U.S. PATENT DOCUMENTS

| | | |
|---|---|---|
| 6,360,271 B1 | 3/2002 | Schuster et al. |
| 6,553,040 B2 | 4/2003 | Bernath et al. |
| 6,574,225 B2 | 6/2003 | Reynolds et al. |
| 6,611,537 B1 | 8/2003 | Edens et al. |
| 6,661,804 B2 | 12/2003 | Fellman et al. |
| 6,675,314 B1 | 1/2004 | Yamada et al. |
| 6,763,479 B1 | 7/2004 | Hebert |
| 6,857,080 B1 | 12/2005 | Liang |
| 7,000,031 B2 | 2/2006 | Fischer et al. |
| 7,096,271 B1 | 8/2006 | Omoigui et al. |
| 7,206,367 B1 | 4/2007 | Moore |
| 7,251,199 B2 | 7/2007 | Eidson |
| 7,342,890 B1 | 3/2008 | Ferguson |
| 7,551,647 B2 | 6/2009 | Fellman et al. |
| 7,590,151 B2 | 9/2009 | Middleton et al. |
| 7,643,595 B2 | 1/2010 | Aweya et al. |
| 7,689,854 B2 | 3/2010 | Ilnicki et al. |
| 7,747,725 B2 | 6/2010 | Williams et al. |
| 2001/0038674 A1 | 11/2001 | Trans |
| 2002/0099814 A1 | 7/2002 | Mastrianni |
| 2002/0136198 A1 | 9/2002 | Findikli |
| 2002/0150053 A1 | 10/2002 | Gray et al. |
| 2003/0002483 A1* | 1/2003 | Zwack ............... H04J 3/0673 370/352 |
| 2003/0093703 A1 | 5/2003 | Oliver et al. |
| 2003/0156603 A1 | 8/2003 | Rakib et al. |
| 2003/0223409 A1 | 12/2003 | Wiebe |
| 2003/0235216 A1 | 12/2003 | Gustin |
| 2003/0236904 A1 | 12/2003 | Walpole et al. |
| 2004/0001435 A1 | 1/2004 | Wong |
| 2004/0052209 A1 | 3/2004 | Ortiz |
| 2004/0062278 A1 | 4/2004 | Hadzic et al. |
| 2004/0100942 A1 | 5/2004 | Blank et al. |
| 2004/0228367 A1 | 11/2004 | Mosig |
| 2004/0234000 A1 | 11/2004 | Page |
| 2004/0252400 A1 | 12/2004 | Blank et al. |
| 2005/0002402 A1* | 1/2005 | Fairman ............... H04L 65/608 370/395.5 |
| 2005/0036512 A1 | 2/2005 | Loukianov |
| 2005/0039065 A1 | 2/2005 | Cheung et al. |
| 2005/0138458 A1 | 6/2005 | Yoon et al. |
| 2005/0166135 A1 | 7/2005 | Burke |
| 2005/0201399 A1 | 9/2005 | Woodward et al. |
| 2005/0286501 A1 | 12/2005 | Higuchi |
| 2005/0288805 A1 | 12/2005 | Moore et al. |
| 2006/0005099 A1 | 1/2006 | Strasman et al. |
| 2006/0007961 A1 | 1/2006 | Gray et al. |
| 2006/0013262 A1 | 1/2006 | Downey et al. |
| 2006/0013263 A1 | 1/2006 | Fellman |
| 2006/0056432 A1 | 3/2006 | Azarov |
| 2006/0072578 A1 | 4/2006 | Alfano |
| 2006/0092895 A1 | 5/2006 | Kim et al. |
| 2006/0135258 A1 | 6/2006 | Maheshwari et al. |
| 2006/0161835 A1 | 7/2006 | Panabaker et al. |
| 2006/0280182 A1 | 12/2006 | Williams et al. |
| 2007/0002886 A1 | 1/2007 | Lanigan et al. |
| 2007/0280123 A1 | 1/2007 | Atkins et al. |
| 2007/0076727 A1 | 4/2007 | Shei |
| 2007/0081562 A1 | 4/2007 | Ma |
| 2008/0013546 A1 | 1/2008 | Bhatt |
| 2008/0187282 A1 | 8/2008 | Brady et al. |
| 2009/0274149 A1 | 11/2009 | Williams et al. |
| 2010/0046383 A1 | 2/2010 | Williams et al. |
| 2010/0228881 A1 | 9/2010 | Williams et al. |
| 2010/0235486 A1 | 9/2010 | White et al. |
| 2011/0002429 A1 | 1/2011 | Williams et al. |
| 2011/0182205 A1* | 7/2011 | Gerdes ............... H04L 12/2818 370/254 |

FOREIGN PATENT DOCUMENTS

| | | |
|---|---|---|
| WO | WO 00072509 | 11/2000 |
| WO | WO 04008738 | 1/2004 |
| WO | WO 05006621 | 1/2005 |
| WO | WO 06057992 | 6/2006 |
| WO | WO 07131296 | 11/2007 |
| WO | WO 07131297 | 11/2007 |
| WO | WO 08138047 | 11/2008 |
| WO | WO 09105838 | 9/2009 |

OTHER PUBLICATIONS

Schulzrinne, H., et al., "RTP: A Transport Protocol for Real-Time Applications" 104 pps, Columbia University, Jul. 2003.

CobraNet Programmer's Reference, Version 2.5, Cirrus Logic, Inc., 147 pps, Feb. 2006.

Baker, Fred, "Changing the Default for Directed Broadcasts in Routers—Requirements for IP Version 4 Routers", Cisco Systems, 175 pps, Jun. 1995.

Audinate, "Overview of Dante Audio Networking", 15 pps, 2007.

"Timing and Synchronization for Time-Sensitive Application in Bridged Local Area Networks" IEEE, 204 pps, Feb. 22, 2008.

"Audio Video Bridging (AVB) Systems", IEEE, 54 pps, Nov. 17, 2009.

"Virtual Bridged Local Area Networks—Revision", IEEE, 300 pages, Sep. 12, 2005.

"IEEE Standard for Local and Metropolitan Area Networks: Overview and Architecture", 74 pps, IEEE, 2014.

Teener, Michael T., "AVB Standards Status", 5 pps, Jul. 16, 2008.

"IEEE Standard for a Precision Clock Synchronization Protocol for Networked Measurement and Control Systems", IEEE, 154 pps, Nov. 8, 2002.

"IEEE P1733™/D2.0, Draft Standard for Layer 3 Transport Protocol for Time Sensitive Applications in Local Area Networks", IEEE, 20 pps, Feb. 2009.

International Search Report dated Mar. 2, 2009 for PCT/AU2009/000253.

European Search Report for EP09715895 dated Aug. 19, 2011.

Blank et al. "An Internet Protocol (IP) Sound System", AES (Audio Engineering Society) 117th Convention San Francisco, CA (Oct. 2004).

David V. James; "Transmit State Machines"; IEEE 802.3 Residential Ethernet Study Group presentation; Sep. 21, 20015; pp. 107-121.

Felix F. Feng; "On the worst case, and pacing"; IEEE 802.3 Residential Ethernet Study Group presentation; Sep. 30, 2005; slides 1-17.

Geoffrey M. Garner; "Delay and Delay Variation Simulation Results for Additional Multi-hop Conventional Ethernet Cases with Bursting/Bunching"; IEEE 802.3 Residential Ethernet Study Group presentation; Sep. 14, 2005; slides 1-24.

Geoffrey M. Garner; "Delay and Delay Variation Simulation Results for Multi-hop Conventional Ethernet Cases with Bursting/Bunching"; IEEE 802.3 Residential Ethernet Study Group presentation; Aug. 19, 2005; slides 1-33.

John Nels Fuller; "Calculating theDelay Added by Qav Stream Queue"; IEEE 802.1 Qav presentation; Aug. 12, 2009; pp. 1-4.

Max Azarov; "On worst-case Latency for Ethernet networks and alternative shaping concept"; IEEE 802.3 Residental Ehternet Study Group. Forum available at http://grouper.ieee.org/group/802/3/re_study/email/msg00680.html; Sep. 26, 2005.

Max Azarov; "On worst-case Ethernet Network Latenc for Shaped Sources"; IEEE 802.3 Residential Ethernet Study Group presentation; Oct. 7, 2005; pp. 1-12.

Yamaha Systems Solutions white paper, Networked audio system design with CobraNet, 16 pages, 2006.

* cited by examiner

NETWORK DEVICES, METHODS AND/OR SYSTEMS FOR USE IN A MEDIA NETWORK

CROSS REFERENCE TO RELATED APPLICATIONS

This application is a continuation of U.S. patent application Ser. No. 12/735,925, filed 26 Aug. 2010, which is the U.S. National Phase application of International Application No. PCT/AU2009/000253, filed 2 Mar. 2009, which designates the United States, which in turn claims priority from Australian provisional application 2008901020, filed 29 Feb. 2008, entitled, A Network Device in a Media Network. The present application is related to PCT application AU2008/000656, filed 12 May 2008, entitled Systems, Methods and Computer-Readable Media for Configuring Receiver Latency, and related Australian provisional applications 2007902513, filed 11 May 2007, and 2007902582, filed 15 May 2007; PCT application AU2007/000668, filed 17 May 2007, entitled, Transmitting and Receiving Media Packet Streams, and related Australian provisional applications 2006902741, filed 17 May 2006, and 2006906015, filed 19 Oct. 2006; PCT application AU2007/000667, filed 17 May 2007, entitled, Redundant Media Packet Streams, and related Australian provisional applications 2006902741, filed 17 May 2006, and 2006906015, filed 19 Oct. 2006; PCT application AU2006/000538, filed 21 Apr. 2006, entitled, Method for Transporting Digital Media, and related Australian provisional applications 2005902065, filed 22 Apr. 2005, and 2005906272, filed 11 Nov. 2005. The entire content of each of these applications is hereby incorporated by reference.

TECHNICAL FIELD

In certain aspects, the present disclosure is related to devices, methods, systems and/or computer-readable media for use in an isochronous media network in which media devices connected to a network employ one or more synchronization signals to regulate or facilitate the transmission of media signals through the network. In other aspects the present disclosure concerns devices, methods, systems and/or computer-readable media for use in the transmitting and receiving of digital media packets, such as, but not limited to, audio channels, video channels, lighting instructions or combinations thereof, within a media network. In other aspects, the present disclosure concerns an Internet Protocol (IP) routed media network containing multiple IP subnets. Aspects of the present disclosure include a clock master device, a media network, a method, and computer software.

BACKGROUND

Digital media packets are transmitted and received by media devices within a media network. Known isochronous media networks exist that are able to transmit these media packets with tight timing requirements to enable synchronised play out of the multiple media channels on multiple media devices.

These networks enable the transmission of media packets within networks sharing the same IP subnet or Ethernet broadcast domain for non-IP networks. That is, within networks sharing the same IP subnet or Ethernet broadcast domain known methods exist to allow synchronisation of clocks of the media devices, and methods to send and receive digital media packets Typically, isochronous media networks are optimized for local communication, either in a single LAN or a small number of LANs in which all devices can be directly reached by multicast or broadcast transmission. The local nature of the network often allows low latency signal transmission to be achieved. Senders and receivers in the network regulate the transmission of media signals using a synchronization signal communicated from a master device to all devices in the network. The local nature of the network makes reaching all devices in the network with multicast or broadcast transmission feasible. However, the methods used to distribute the synchronization signal prevent the isochronous media network from scaling beyond a small number of LANs. The local nature of these isochronous media networking technologies makes it difficult to build unified media networks larger in scale than a few hundred devices on a single LAN. With existing systems it is difficult to deploy media networks in many environments which typically employ numerous LANs connected by a routed internetwork (enterprise networks, campus networks, wide area networks).

Accordingly, what is needed are devices, methods, systems and/or computer-readable media for use in a larger unified, or substantially unified, isochronous network created from aggregating local isochronous media networks in which media devices connected to a network employ one or more synchronization signals distributed from local master clocks to regulate or facilitate the transmission of media signals. Also what is needed are devices, methods, systems and/or computer-readable media for sending and receiving digital media packets in a larger unified, or substantially unified, isochronous media network created from aggregating local isochronous media networks into larger unified, or substantially unified, isochronous media networks.

DETAILED DESCRIPTION

Certain embodiments are related devices, methods, systems and/or computer-readable programs that enable the connection one or more local isochronous media networks together to form a larger unified, or substantially unified, isochronous media network such that a sender in one local media network can transmit a media signal to a receiver in a different local media network. To achieve this, senders and receivers in different media networks are enabled to be capable of matching, or substantially matching, transmission and reception rates so that receiver underrun/overrun is prevented, or substantially prevented; and media signals are be able to pass from one network to another.

Certain embodiments provide a network device for synchronizing a plurality of media devices in a network, said network device comprising: an input interface receiving a time service or network time protocol; a local clock synchronized to a time service; and an output interface for transmitting a synchronization signal which coordinates the transmission of media signals through the network where the local clock is used to control the transmitted synchronization signal. Certain embodiments provide a network device that is capable of providing a time service to a plurality of devices in a network, said network device comprising: an input interface for a reference signal, where said input reference signal is at least one of: a reference media clock or media signal input, a synchronization signal which coordinates the transmission of media signals through the network, and/or an internal reference clock; a local clock governed by the input reference signal; and an output interface providing said time service to said network devices via a clock synchronization protocol and/or synchronization signal. In certain aspects, a network device is provided that is capable of providing a service discovery service, and/or a buffering/re-timing service for jittered packet streams. In certain aspects, a network device is provided that is capable of providing a function for bridging a media signal between one or more incompatible isochronous media networks. In certain aspects, a network device is provided that is capable of providing one or more network management functions. In certain aspects, a network device is provided wherein said input interface is capable of providing at least one input reference signals selected from: at least one of an AES word clock, an other word clock, audio signals and/or video signals. In certain aspects, a network device is provided wherein said network device is operable to synchronize additional network devices by transmitting a master clock signal at said output interface. In certain aspects, a network device is provided wherein said synchronization signal comprises at least one of IEEE 1588, NTP, IEEE 802.1AS or other versions of IEEE 802.1, and any other network time protocol. In certain aspects, a network device is provided wherein said media transport protocol comprises at least one of Real-time Transport Protocol (RTP), Dante, an IEEE1733 extension of RTP, and any other routable transport protocol. In certain aspects, a network device is provided wherein said network comprises at least one of a local area network (LAN), a virtual local area network (VLAN), one or more IP subnets, a CobraNet network, a Dante network, an Audio Video Bridging (AVB) network, and a wide area network (WAN). In certain aspects, a network device is provided wherein at least one media device in a first network is capable of sending and/or receiving synchronization information to at least one media device in a different network such that the media devices are capable of matching transmission and reception rates so that receiver underrun and/or overrun is prevented, substantially prevented, or acceptable. In certain aspects, a network device is provided wherein at least one media device in a first network is capable of sending and/or receiving media signals to another media device in a different network such that the media signals are able to pass from one network to at least one other network.

Certain embodiments provide methods of synchronizing a plurality of media devices in a network consisting of an aggregation of one or more local media networks using at least one synchronization signal, where said method comprising the steps of: (a) transmitting at least one synchronization signal from a master clock device; (b) receiving said synchronization signal at one or more media devices in said network; and (c)transporting media signals from one or more media devices to at least another of said media devices using a media transport protocol; wherein said steps a) and b) are performed using at least one synchronization signal. In certain aspects, the methods include the further steps of: receiving said synchronization information at a network device; and transmitting said synchronization information from said network device. In certain aspects, the methods use a network device that is a slave network device that synchronizes with said network using said synchronization information from said master clock device. In certain aspects, the methods the synchronization signal comprises at least one of IEEE 1588, NTP, IEEE 802.1AS or other versions of IEEE 802.1, and any other network time protocol. In certain aspects, the methods use a media transport protocol that comprises at least one of Real-time Transport Protocol (RTP), Dante, an IEEE1733 extension of RTP, and any other routable transport protocol. In certain aspects, the methods are used with a network that comprises at least one of a local area network (LAN), a virtual local area network (VLAN), one or more IP subnets, a CobraNet network, a Dante network, an Audio Video Bridging (AVB) network, and a wide area network (WAN). In certain aspects, the methods use at least one media device in a first network is capable of sending and/or receiving synchronization information to at least one media device in a different network such that the media devices are capable of matching transmission and reception rates so that receiver underrun and/or overrun is prevented, substantially prevented, or acceptable. In certain aspects, the methods use at least one media device in a first network is capable of sending and/or receiving media signals to another media device in a different network such that the media signals are able to pass from one network to at least one other network. In certain aspects, the methods use media packets that are routed, forwarded, tunneled, translated, and/or received and retransmitted from one media network so that the media signal they contain can be conveyed to another media network and received as a stream of media packets. In certain aspects, the methods use a media device on one network that can use a discovery service to discover devices, media channels and/or other information associated with the media devices in another media network.

Certain embodiments provide a system for synchronizing a plurality of media devices in a network using at least one synchronization signal, said system comprising: one or more network devices for transmitting synchronization information; a plurality of media devices for receiving said synchronization information; wherein said one or more network devices transmit said synchronization information to said plurality of media devices using at least one synchronization signal; and wherein each of said plurality of media devices use said synchronization information to synchronize among said plurality of media devices in order to transfer media signals at least to or from one or more of said plurality of media devices using a routable transport protocol. In certain aspects, a system is provided wherein said system further comprises a slave network device for receiving said synchronization information from said one or more network devices and transmitting said synchronization to one or more of said plurality of media devices. In certain aspects, a system is provided wherein said synchronization signal comprises at least one of IEEE 1588, NTP, IEEE 802.1AS or other versions of IEEE 802.1, and any other network time protocol. In certain aspects, a system is provided wherein a media transport protocol comprises at least one of Real-time Transport Protocol (RTP), Dante, an IEEE1733 extension of RTP, and any other routable transport protocol. In certain aspects, a system is provided wherein said network comprises at least one of a local area network (LAN), a virtual local area network (VLAN), one or more LP subnets, a CobraNet network, a Dante network, an Audio Video Bridging (AVB) network, and a wide area network (WAN). In certain aspects, a system is provided wherein at least one media device in a first network is capable of sending and/or receiving synchronization information to at least one media device in a different network such that the media devices are capable of matching transmission and reception rates so that receiver underrun and/or overrun is prevented, substantially prevented, or acceptable. In certain aspects, a system is provided wherein at least one media device in a first network is capable of sending and/or receiving media signals to another media device in a different network such that the media signals are able to pass from one network to at least one other network. In certain aspects, a system is provided wherein media packets are routed, forwarded, tunneled, translated, and/or received and retransmitted from one media network so that the media signal they contain can be conveyed to another media network and received as a stream of media packets. In certain aspects, a system is provided wherein a media device on one network can use a discovery service to discover devices, media channels and/or other information associated with the media devices in another media network.

Certain embodiments are related devices, methods, systems and/or computer-readable programs that enable coordination of clock masters in each local isochronous media network. This enables senders and receivers to match rates and, in networks that support it, time align signals played out at different receivers.

Certain embodiments are related to the coordination of local isochronous clock masters. Coordination between clock masters may be achieved in certain embodiments by slaving them to some common, shared clock. For example, a clock master for an local isochronous media network may be slaved to: a local clock master in another network domain (e.g. via unicast IEEE1588 or via NTP); a GPS signal (or other reference signal) providing a shared clock source for the domains and/or a synchronization server accessible via the network (e.g. via unicast IEEE1588 or via NTP).

Certain embodiments are related devices, methods, systems and/or computer-readable programs that enable routing, forwarding, tunneling, translating, or receiving and retransmitting media packets from one media network so that the media signal they contain can be conveyed to at least one other media network and received as a stream of media packets.

Additional aspects of certain disclosed embodiments include functions to assist in uniting disparate media networks into a single media network. For example, but not limited to: unified discovery services for devices and media channels and other information associated with the media devices spanning the aggregated networks; buffering and retiming of jittered media packet streams; providing network management functions to simplify the operation of local media networks; combining the above functions into a stand alone VLAN-capable device, into a switch, into a router, into a media device; or combinations thereof. In certain aspects, the unified discovery services for devices and media channels and other information associated with the media devices spanning the aggregated networks may also simplify connection setup between devices in different local media networks.

Certain embodiments provide a media network comprising: two or more isochronous media networks interconnected by one or more routers or switches, each isochronous media network comprising one or more network devices to communicate with a clock synchronization source or with another network device at another isochronous media network, and to communicate with one or more media devices to send and receive media packets between the two or more isochronous media networks with reference to a local clock; wherein the one or more network devices comprises: at least one input port to receive a time service or network time protocol, at least one processor to derive a synchronization signal from the time service or network time protocol, and at least one output port to provide the synchronization signal to the one or more media devices; such that the media packets are receivable by the one or more media devices from another of the one or more media devices via the one or more routers or switches.

Certain embodiments provide at least one clock master device connectable to at least one media network, the at least one clock master device comprising: at least one input port to receive at least one digital audio clock signal; at least one processor to derive at least one master clock signal from the at least one digital audio clock signal, at least one output port to provide the at least one master clock signal to the at least one media network via at least one network time protocol; such that the at least one master clock signal is receivable by media devices of the at least one media network in order to synchronise, or substantially, synchronise, the media devices local clocks to the at least one master clock signal.

In certain embodiments, the at least one clock master device, may alternatively, or in addition, store and provide information needed by a media device to assist in network management.

Certain embodiments provide at least one clock master device connectable to at least one media network, the at least one clock master device comprising: at least one input port to receive at least one digital audio clock signal and/or media clock signal; at least one processor to derive at least one master clock signal from the at least one digital audio clock signal and/or media clock signal, at least one output port to provide the at least one master clock signal to the at least one media network via at least one network time protocol; such that the at least one master clock signal is receivable by media devices of the at least one media network in order to synchronise, or substantially, synchronise, the media devices local clocks to the at least one master clock signal.

Service discovery may in certain embodiments be a useful aspect to the inventions disclosed herein. In certain embodiments, the network device may further comprise storage means, such as removable flash memory, to store information relating to the media devices and their media channels. In other embodiments information relating to the media devices and their channels may also be stored in a network directory (e.g. an LDAP or NIS directory) or other network management configuration store accessible to the network device. In certain embodiments, the at least one network device may further comprise at least one network port to receive lookup requests from media devices. In certain embodiments, the network port or connection can be used for clock synchronization, transport, buffering, retiming, management of media devices, management of the clock master device or combinations thereof (for example, but not limited to, firmware update, providing network configuration, configuring media signal routing, etc).

In certain embodiments, the at least one processor may further operate to process requests by extracting the requested information from the storage means, and the at least one output port may further operate to provide the requested information. In certain embodiments, the at least one network device, may alternatively, or in addition, store and provide information needed by a media device to assist in network management.

In certain embodiments, other aspects of the disclosed systems, methods, devices and computer program products may include additional functions to assist in uniting disparate media networks into a single network, such as, but not limited to: discovery services for devices and media channels to simplify connection setup between devices in different local media networks; buffering and retiming of jittered media packet streams; receiving and retransmitting audio from one media network type to another (e.g. from CobraNet to Dante); and providing network management functions to simplify the operation of local media networks.

Before a media device can send media signals to another media device a setup phase is required in which it may be necessary to configure these media devices as well as configure a signal flow between them. Local media networks typically provide a discovery mechanism to facilitate the configuration of media network devices, their functions and the signal flows between them. Broadcast and/or multicast discovery protocols are often used, however these protocols are local in nature and not typically forwarded through the routers used to build internetworks. Certain embodiments of the present disclosure provide a discovery mechanism to effectively facilitate the configuration of media networks over aggregated networks. Typically, providing a discovery mechanism that spans one or more isochronous media networks connected via an internetwork requires one or more of:

1. The use of a discovery protocol that can communicate with a discovery server not located on the local network (e.g. Dante uses DNS-SD) to register and/or look up information related to media devices, their properties and media channels; and the provision of one or more discovery servers to provide a shared database.
2. Bridging, flooding or tunneling service discovery messages between local isochronous media networks.
3. Providing a device in each local media network which can mediate between a server-less discovery protocol and one or more non-local discovery servers to provide discovery spanning multiple local media networks.

Media packets traveling through local isochronous media networks typically experience variation in transmission delay which is tightly bounded and which can be compensated for by buffering in the receiver. The quantity of buffering required in the receiver and intervening packet forwarding devices depends on the expected worst cast delay variation. Transmission from one local media network to another local media network may result in delay variation that may not be compensated for by the quantity of buffering present in the receiver and this may results in errors in signal transmission. Errors may be avoided by providing a buffering/re-timing function in the receiving network(s) consisting of a receiver with large buffers which in turn re-transmits a media signal into the receiving local media network as a low jitter packet stream.

A number of local isochronous media network solutions are on the market today and some (e.g. CobraNet) have achieved a certain amount of deployment. In certain embodiments the network device acts as a bridge device which can be used to aggregate media networks using purely local media networking technologies like CobraNet. The network device receives a media signal using one local-only networking technology and then re-transmits the media signal to a non-local receiver using a routable media networking technology like Dante.

Devices in media networks supporting non-local communication need to be configured with various networking parameters suitable for the administrative domain in which they reside. For example, devices in a routable IP network must obtain a unique IP address in their IP subnet as well as information allowing them to send packets to devices not connected to their local network. Furthermore, devices in an aggregated media network may need additional configuration to enable them to use service discovery servers, buffering/re-timing functionality or any other service beneficial to aggregates of local media networks. Network management configuration and complexity can be reduced if beneficial services are co-located in a network management device such that appropriate configuration information relating to available services is automatically supplied to media devices. In some applications, monitoring the elements of a media network for changes or faults is highly desirable or is required by law. Co-locating polling and logging functions with discovery and configuration functions can reduce the number and/or type of failure modes for the networked system. In certain embodiments the network device may include the network management services described above so as to simplify the management of the aggregated local media networks.

Certain embodiments provide a media network comprising: two or more sub-networks having different Internet Protocol (IF') subnets and interconnected by one or more routers, each sub-network having one or more media devices to send and receive media packets on the media network with reference to a local clock; a first network device comprising: at least one input port to receive a digital audio clock signal, a processor to derive a master clock signal from the digital audio clock signal, an output port to provide the master clock signal to the media network via a network time protocol; such that the master clock signal is receivable by the media devices in order to synchronise their local clocks to the master clock signal.

Certain embodiments provide a system to combine sub-networks comprising: two or more sub-networks capable of being interconnected by one or more routers, each sub-network having one or more media devices capable of sending and receiving media packets on the media network with reference to at least one local clock; a first network device comprising: an at least one input port to receive a clock signal, at least one processor to derive at least one master clock signal from the clock signal, at least one output port to provide the master clock signal to the media network via at least one network time protocol; such that the master clock signal is receivable by the media devices in order to synchronise their local clocks to the master clock signal.

In certain embodiments, the clock signal is a digital audio clock signal. In certain embodiment, the first network device may be the same as the master clock device described above.

In certain embodiments, the look-up request may be received from a first media device and relates to a second media device, wherein the first and second media devices have different IP subnets. The look-up request may be made using the Domain Name System (DNS) protocol. The network port may further operate to receive from the second media device information relating to features or media channels of the second media device using DNS Dynamic Updates (DDNS), and the storage means then stores this information.

In certain embodiments, the media network may further comprise a second network device, where the first network device and the second network device have different IP subnets. The second network device may receive as input the master clock signal of the first network device and to provide the master clock signal that is receivable by the media devices on the same IP subnet only.

In certain aspects, the media network may further comprise a third network device, where the first, second and third network device have different IP subnets. The third network device may receive as input the master clock signal of the second network device and operates to provide the master clock signal that is receivable by the media devices on the same IP subnet only.

In certain embodiments, the storage means of the second network device may store the location of the first network device within the network. The second network device may discover the location of the first network device using a lookup request, or via network management information provided to it.

In certain aspects, the media device may be a transmitter and/or receiver of digital media packets, and may receive the master clock signal based on unicast IP messages.

In yet a further aspect the disclosure provides a method performed by the master clock device to provide a master clock signal, discovery service and/or network management service as described above.

Certain embodiments relate to systems, methods, devices and computer program products for use in the transmitting and receiving of digital media packets via audio channels, video channels, lighting instructions or combinations thereof, within a media network.

Certain embodiments relate to systems, methods, devices and computer program products for use in isochronous media networks that employ some type of synchronization signal for regulating the transmitting and receiving of digital packets of information.

In certain embodiments, computer software is provided that when installed on the master clock devices, causes it to operate in accordance with certain methods disclosed.

A variety of network time clock master devices are available on the market. These devices typically support clock inputs from other time sources like Global Positioning Systems (GPS), and Pulse Per Second (PPS) from a stable/calibrated local oscillator. Unlike the current disclosure they do not support audio or other reference media clock inputs like video signals, time codes including SMITE or MIDI Time Code, AES3 or audio word clock inputs. For example, large digital audio installations have existing methods for clocking and synchronising audio devices. Many existing devices in such facilities are not networked and are connected together via point to point cabling carrying signals. Synchronization between devices is required for error free, or substantially error free, transmission of video or digital signals between equipment and this is may be achieved in certain embodiments by embedding synchronization information in the digital signal itself (e.g. AES3) or by a separate synchronization cable distributing a reference clock signal (e.g. video black burst or audio word clock). The equipment and the cabling between it form a synchronization tree with a master device at the root of the tree. In certain embodiments, the master device can be a dedicated timing reference or it can be a media processing device such as a mixing console. A network time server with audio clock input allows networked audio devices and existing non-networked audio devices in a facility to be synchronized. In certain embodiments, a network time server with a media signal reference clock input allows a reference clock to be distributed to audio and/or video devices over a network, eliminating or greatly reducing the need for separate synchronization cabling and offering increased flexibility over point to point cabling. Distribution of a reference signal sourced from a media source allows networked media devices and non-networked media devices to be synchronized and therefore connected together into a larger system. In addition to frequency synchronization, the time server can provide a notion of absolute time, enabling time alignment of signals throughout the network and enabling the provision of time code information to networked and non-networked devices.

It is a further advantage of certain embodiments that the co-location of clock master and service discovery functions with network management functions in the same device allows simple network setup and management.

It is yet a further advantage of at least one embodiment of the present disclosure that the use of unicast protocols to access synchronization and service discovery services enables network scalability since it avoids the flooding of multicast service discovery and/or clocking information around the network. A network containing hundreds of devices can generate sufficient service discovery advertisements/lookups and clock synchronization messages to overwhelm devices with slow CPUs—typically those based on microcontrollers or other low cost parts. A method of connecting local media networks together by flooding synchronization and service discovery messages throughout all interconnected networks exacerbates this problem. Instead in certain embodiments of the present disclosure, unicast protocols are used. These unicast packets are ignored by the network interfaces unless explicitly destined for the local device. In certain embodiments, the use of unicast protocols and network servers introduces hierarchy into the media network such that media devices do not typically need to be aware of all, or substantially all, devices in the local network or devices in other networks until they need to communicate with them. In certain embodiments network servers centralize information for one or more local media networks and unicast protocols allow devices in other domains to access required subsets of that information when needed. Accordingly, the present disclosure enables isochronous media networks to scale from the hundreds of devices per network possible today to many tens of thousands of devices. Examples of local isochronous media networks which can be combined include, but are not limited to, Dante, CobraNet, AVB/IEEE1722, and AVB/IEEE1733 networks, Ethersound and/or Livewire.

BRIEF DESCRIPTION OF THE DRAWINGS

Features and advantages will become apparent from the following description of embodiments thereof, by way of example only, with reference to the accompanying drawings, in which.

Throughout this description, the same reference numerals have been used to refer to the same features in the drawings.

Figure 1:
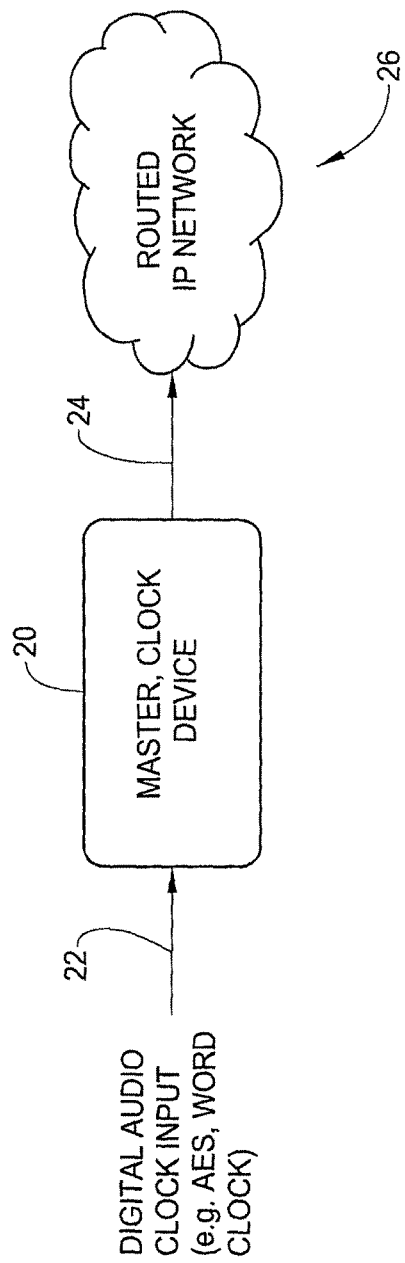
FIG. 1 is a schematic diagram of the inputs and outputs to a master clock device in accordance with certain embodiments.

In an isochronous media network, receivers consume network packets at the same rate, or substantially the same rate, that they are being produced by the sender and there is a constant, or substantially constant phase relationship (or time delay) between the sender and a given receiver. Different receivers from the same source may have different delays and different sources may have different delays, however a smooth, or substantially smooth, transfer of a signal from the sender to the receiver occurs, ideally with no loss or minimal lose.

In certain embodiments, local isochronous media network may coordinate the transmission of media signals through the network by distributing a synchronization signal from a master device to media devices in the network. There are various techniques that may be used to provide a synchronization signal for a network in accordance with the present disclosure, including, but not limited to, the following: in Dante, the synchronization signal may be provided by the IEEE1588 and/or 802.1as clock synchronization protocols; in CobraNet, the synchronization signal may be provided by a regular, or substantially regular, "beat packet" emitted by the "conductor" device; in Ethersound, the synchronization signal may be provided by a regular stream of media packets sourced by the device at the beginning of the logical chain of network links; and in IEEE1722 and IEEE1733, the synchronization signal may be provided by the combination of at least one media signal and at least one network time protocol. A synchronization signal may be a media signal sourced by at least one device and timestamped by that sending device using a clock that may be synchronized using an 802.1 as clock master via an 802.1as clock synchronization protocol.

One aspect of the present disclosure is to use devices, methods, systems and/or computer readable media to connect one or more local isochronous media networks together to form a larger unified isochronous media network such that a sender in one local media network can transmit a media signal to a receiver in a different local media network. To achieve this, senders and receivers in different media networks are able to match, or substantially match, transmission and reception rates so that receiver underrun/overrun is maintain at acceptable levels. In certain embodiments, acceptable levels of receiver underrun/overrun may mean preventing, or substantially, preventing, gaps or discontinuities in the received media signal resulting in one visible artifact in three hours of video playback. In certain embodiments acceptable levels of receiver underrun/overrun may mean preventing, or substantially, preventing gaps or discontinuities in the received media signal resulting in two, three, four, five, six, eight, or ten visible artifacts in three hours of video playback. In certain embodiments, acceptable levels may mean substantially preventing gaps or discontinuities in the received media signal resulting in audible clicks or pops over 24 hours of audio playback. Audio artifacts are much more likely to be perceived than video artifacts. In certain embodiments, audio glitches occurring more frequently than once every 10 minutes are likely to be considered unacceptable. In certain embodiments, audio glitches occurring more frequently than once every 2, 5, 10 15, or 20 minutes are likely to be considered unacceptable. In certain embodiments, video glitches occurring more frequently than once every 30 minutes are likely to be considered unacceptable. In certain embodiments, video glitches occurring more frequently than once every 5, 10, 15, 20, 25, 30, 35, 40, 50 or 60 minutes are likely to be considered unacceptable.

In addition, in certain embodiments the interconnected networks are capable of permitting the media signals to pass from one network to another.

In certain embodiments, the connection of one or more local isochronous media networks may be accomplished by coordination of clock masters in each local isochronous media network. This enables senders and receivers to match rates, or substantially match rates and, in certain networks that support it, time align signals played out at different receivers. In addition, another aspect is the routing, forwarding, tunneling, translating, or receiving and retransmitting media packets from one media network so that the media signal they contain can be conveyed to the other media network and received as a stream of media packets.

With respect to coordination of local isochronous clock masters, typically each network domain has a local clock master. The local clock masters additionally become slaves of a superior clock and synchronize or synchronise the local network clock (as distributed by the local clock synchronization signal) to the superior clock. Not all local synchronization signals provide absolute time information to slaves, for example the CobraNet transmission method has no concept of absolute time information, and in these cases syntonization (i.e. rate matching) of the local clock to the superior clock is all that is required. Furthermore, in certain situations the relationship between local clock masters may not have to a master/slave type relationship, since there are existing multi-master clock synchronization protocols, however it is often the case that a master/slave or hierarchical relationship is employed.

In certain embodiments, once a network has been set up between the various local media networks which need to be synchronized and over which the network time protocol may operate, then the synchronization signals coordinating transmission in each local media network will be substantially rate synchronized and time aligned with synchronization signals in other local media networks. This allows transmitters and receivers in different local media networks to match their transmission and reception rates to ensure error free, or substantially error, free transmission of media signals between separate local media networks. Further, if time alignment is supported by the local synchronization signal, media signal time alignment information may be communicated between the media networks by means of timestamps contained in media packets which are in turn related to the shared clock provided by the network time protocol linking the local media networks. This allows for one or many receivers receiving the same media signal from a transmitter to time-align their output.

It is possible to use certain disclosed embodiments with a number of different networks. For example the network may be a routable IP network, a wide area network, a set of Virtual LANs (VLANs) in a switched Ethernet network or even a single LAN shared by two different isochronous media networking technologies (for example, CobraNet and Dante on the same network) or combinations thereof.

In certain embodiments, coordination between clock masters may achieved by slaving them to some common, shared clock. This can be accomplished in a number of ways. For example, a clock master for a local isochronous media network may be slaved to a local clock master in another network domain (e.g. via unicast IEEE1588 or via NTP). Typically this may require that the master/slave relationships form a spanning tree connecting the local clock masters in local isochronous media networks, the aggregated network may be synchronized, or substantially synchronized. Another example is a GPS signal (or other reference signal) providing a shared clock source for the domains. If the local clock masters are slaved to GPS, they typically will be synchronized. This has a potential disadvantage in that additional equipment beyond the network connection may be required. Another example is a synchronization server accessible via the network (e.g. via unicast IEEE1588 or via NTP). Providing the master/slave relationships between the servers and the local clock masters in each local isochronous media network form a spanning tree, the entire aggregate network will be synchronized.

In the Internet, the Network Time Protocol (NTP) has commonly been used to synchronize clocks on computer systems. NTP has a defined concept of clock hierarchies; however these have been designed for clock synchronization of general purpose computers and other IT equipment rather than for media networking. The performance of these clock hierarchies through the Internet typically produces clocks that are 10 s of milliseconds apart in time with standard deviations in the 10 s-100 s of milliseconds. In a local LAN, NIP typically synchronizes to within a millisecond however this is not sufficient for media networks which require sample accurate synchronization. In an isochronous system aiming to reduce buffering through tight synchronization, this uncertainty in synchronization unacceptably increases latency. Worse, the NTP algorithms can sharply slew the local clock which is not good for media clocks tracking the NTP time. Rather than use NTP as the clock synchronization protocol between isochronous media networks, the unicast mode of the IEEE1588 Precision Time Protocol may be used to synchronize a hierarchy of clocks. In the case of Dante, this has the added advantage that a single clock synchronization protocol (IEEE1588) can be used for sub-microsecond timing in local media networks and for synchronizing between media networks. In certain embodiments, the local masters in media networks will likely need to be synchronized to less than 1-5 milliseconds time difference. In certain embodiments, the local masters in media networks will likely need to be synchronized to less than 1-10, 2-7, 3-8, 1-20, 2-15, 5-30, 10-50, 0.5-6, or 1.5-5 milliseconds time difference. This is because clock synchronization inaccuracy may result in early or late packet arrival or timestamps inside packets which appear to be earlier or later than expected. To a receiver, this may be less distinguishable from a variation in transmission delay and the receiver will typically buffer received media signals in order to compensate for it. Receivers often have no more than 10-20 ms of buffering, which is often primarily intended to compensate for variations in transmission delay through the network rather than clock synchronization errors. In certain embodiments, synchronization between sites should be sufficiently tight that only small percentage (e.g. less than 10%) of the available buffering in receivers is budgeted for to compensate for synchronization errors. In certain embodiments, synchronization between sites should be sufficiently tight that only a percentage (e.g. less than 5%, 10%, 15%, 20%, 30%, 50%, 60%, or 75%) of the available buffering in receivers is budgeted for to compensate for synchronization errors. In certain embodiments, if the network between sites is known to have low delay variation (for example, it is a dedicated high bandwidth network), a larger amount of buffering may be budgeted for synchronization errors (e.g. up to 50%). If acceptable synchronization accuracy between sites cannot be achieved, a buffering/re-timing function may be used to de jitter media packet streams on behalf of receivers with insufficient buffering capacity.

In certain disclosed embodiments, clock synchronization servers may operate in a hierarchy, slaving from a superior clock as shown in the following diagram. In certain aspects, multicast and/or unicast clock synchronization variations may be employed. These clock synchronization server may slave to another superior clock synchronization server. This could be via a network using IEEE1588 or 802.1as or perhaps NTP, which has the advantage that a single network connection is used. In certain aspects, they may obtain rate information from one source and absolute time information from the network time protocol. In certain aspects, they may use a reference signal as a time or rate source (for example, use a PPS signal from a stable/calibrated local oscillator, GPS, and/or broadcast time signals to provide a clock source with a known, or substantially know, rate shared between different servers). In certain aspects, that may use a local clock synchronization signal as an input reference signal (for example, CobraNet beat packets). In certain aspects, they may use a media clock as the input reference signal (for example, AES3 input, word clock, video black signal, ADAT sync, other AV sync signal, or combinations thereof). In certain aspects, they may be a member of multiple local network domains at the same time. For example, it could be a VLAN aware device operating on several logical Ethernet networks at the same time or could participate in several IEEE1588 logical synchronization domains on the same network. In certain aspects, the may be the local master for one or more local media networks, possibly transmitting different local clock synchronization signals (for example, Cobranet "beat packets" on one network, IEEE1588 clock synchronization protocol for another).

In certain embodiments, a clock synchronization server may use at least one internal clock as the source of time for the network, or it may use at least one digital audio reference clock (for example, output from a mixing console) to drive network time.

In certain embodiments, clock synchronization server functionality may be integrated into a standalone synchronization server device; a local master clock for one or more isochronous media networks; a network switch or router; a media device in an isochronous media network or combinations thereof.

In certain embodiments, the synchronization server may be the local clock master for one or more isochronous media networks. The synchronization server functions may be incorporated into at least one multiprotocol bridging box.

In certain embodiments, the synchronization server may have various reference signal inputs, including, but not limited to, audio and/or video reference clock inputs.

Once one or more isochronous media networks are synchronized, transmission of media signals between them is possible in accordance with certain disclosed embodiments. Routing, forwarding, tunneling, translating, or receiving and retransmitting media packets, or combinations thereof from one media network to another is then possible. Each local media network is connected to other local networks by an internetwork. Typically, a routed TCP/IP network is used to connect LANs into a larger network, so it is desirable that local media networks of various types can be connected together using a routed TCP/IP network. However, other means may be used to connects the LANs into a larger network.

In certain embodiments, the sender in one network domain and the receiver in a different network domain use IP protocols and share a common media encoding (e.g. Linear PCM, MPEG-2, H.264, etc), the media packets can travel from the sender to the receiver over the IP network connection between the network domains, forwarded by IP routers in the usual fashion. Media packets are not required to be intercepted or processed by a device in order that they can cross between network domains.

In certain embodiments, the sender in one local network and the receiver in a different local network share a common, routable transport protocol like Dante, RTP, the IEEE1733 extension of RTP, etc.). The media packets can travel from the sender to the receiver over the IP network connection between the network domains, forwarded by IP routers in the usual fashion. Media packets are not required to be intercepted or processed by a device in order that they can cross between network domains.

In certain embodiments, where the local isochronous media network protocol in one network is not routable, or is not compatible with the network protocol in use in the other local network, some kind of protocol translation is necessary to get media packets or signal over the internetwork to the receiver. This can be achieved in various ways. For example, one approach is to use a multiprotocol bridge such that media signals are received using the local non-routable media networking transport (e.g. CobraNet) then transmitted over the internetwork to the other local network using a routable media networking protocol (e.g. Dante).

There are a number of different types of translation that may be employed in certain situations to pass a media signal from one local isochronous media network to another, possibly incompatible, local isochronous media network. The present disclosure contemplates Isochronous media networks that can employ a variety of protocols, media signal types and encodings for passing a media signal from one media network to another media network. In certain situations, media packets and signals from one network may not be generally intelligible in a network of a different type. Therefore in certain embodiments, transmission of media signals between isochronous media networks may require one or more of the following: protocol conversion, for example, changing packet encapsulation, changing packet framing (i.e. layout, length, etc), address domains (e.g. Ethernet MAC addresses, IP addresses, TCP/IP port numbers), or combinations thereof; format conversion from one encoding to another, for example, 24 bit to 16 bit audio, or from linear PCM to floating point, video size, between different types of coding/compression, for example PCM to AAC and/or MPEG video to H.264 video, between different types of error recovery mechanisms, for example retry of packets vs. forward error correction and/or loss concealment. In addition, in certain embodiments other additional steps may be used, for example, reserving network bandwidth, for example using RSVP or 802.1Qat, negotiating QoS parameters (e.g. Diffserv or 802.1Qav), allocation of addresses, identifiers or other network resources, or combinations thereof.

In certain embodiments additional functions may be used to assist in uniting disparate media networks into a single Audio Visual network. For example, it may be possible to unified discovery services for devices and media channels spanning the aggregated networks to simplify connection setup between devices in different local media networks. Certain embodiments may provide buffering and retiming of jittered media packet streams. Certain embodiments may provide network management functions to simplify the operation of local media networks. Certain embodiments may combine the above functions into a standalone VLAN-capable device, into a switch, into a router, into a media device. In certain embodiments, it may be desirable to combine one or more of the above functions.

In certain aspects, the present disclosure is related to devices, methods, systems and/or computer-readable media for use in an isochronous media networking in which media devices connected to a network employ at least one synchronization signal to substantially regulate, directly regulate or facilitate the regular transmission of media signals through the network. These media networks are often optimized for local communication, either in a single LAN or a small number of LANs in which all devices can be directly reached by multicast transmission. The local nature of the network allows low latency signal transmission to be achieved (sub-10 ms is common) and millisecond or in the best cases nanosecond accuracy time alignment of signals being input to the network or played out from the network. Senders and receivers in the network are able regulate the transmission and reception rate of media signals using a synchronization signal communicated from a master device to media devices in the network.

Since the network is local, packet transmission delays through the network are usually bounded and consistent, directly contributing to improved clock synchronization accuracy and lower latency for media signal transmission. In addition, network bandwidth is not constrained and the clock synchronization protocols or signals can transmit frequent updates. For example, Dante uses 4 Hz updates; 10 Hz-100 Hz updates have even been proposed for AVB whereas the highest frequency for NTP which is typically used in the wide area is $\frac{1}{64}$ Hz. The local nature of the network makes reaching all devices in the network with a multicast transmission feasible and attractively efficient. Even if multicast is not reliable as is usually the case with wireless networks like 802.11, separate high frequency clock updates to each device is still feasible. The method employed to distribute a synchronization signal through the network defines a "media network domain" and prevents the isochronous media network from scaling beyond a small number of LANs.

The local nature of these isochronous media networking technologies makes it difficult to build unified media networks larger in scale than a few hundred devices on a single LAN. LAN based clock synchronization and transport protocols do not naturally pass through the IP routers which are typically used to connect LANs together. IP multicast can be used to span several LANs (e.g. Livewire can use multicast), however this is complex to deploy and EP multicast is not ubiquitously supported in IP routers. On the other hand, all IP routers are required to support unicast. Basically, it is difficult to deploy media networks in many environments which typically employ numerous LANs connected by a routed internetwork (enterprise networks, campus networks, wide area networks). In certain aspects, the present disclosure describes devices, methods, systems and/or computer-readable media that enable aggregating local isochronous media networks into larger unified isochronous media networks. The local media networks are connected to one another via a routed internetwork, typically a collection of IP routers and network links. Using certain embodiments of the present disclosure it is possible to aggregate local media networks and synchronize those aggregated networks such that the disclosed devices, methods, systems and/or computer-readable media are able to handle aggregated networks that have tens of thousands of media devices. Using certain embodiments of the present disclosure it is possible to aggregate local media networks and synchronize those aggregated networks such that the disclosed devices, methods, systems and/or computer-readable media are able to handle aggregated networks that have up to 1000, 3000, 5000, 10,000, 15,000, 20,000, 50,000, 100,000 or more devices or nodes. In contrast, current local media networks can handle hundreds of nodes in a LAN. Examples of local isochronous media networks which can be combined include, but are not limited to, Dante, CobraNet, AVB/IEEE1722, and AVB/IEEE1733 networks, Ethersound and/or Livewire.

In certain aspects, the present disclosure describes devices, methods, systems and/or computer-readable media that enable aggregating local isochronous media networks into larger unified isochronous media networks wherein the aggregated network is able to deal with a number of different network types in different environments. For examples the present disclosure enables the construction of an aggregated network that has acceptable clock synchronization accuracy and acceptable latency for media signal transmission. In addition, network bandwidth is sufficient such that the clock synchronization protocol or signal can transmit frequent updates.

Some non-limiting examples of isochronous media networks and other systems that the disclosed devices, methods, systems and/or computer-readable media can be used with are: Audinate's Dante technology which uses IEEE1588 or 802.1AS clock synchronization in senders and receivers to produce media clock which is rate matched and time aligned to the clock master. The synchronized local media clock controls the transmission and reception rate of media signals and packets and supports accurate time alignment of media signals at senders and receivers.

The IEEE1588 clock synchronization protocol is usually used in a single Ethernet LAN using link local IPv4 multicast, however it can also operate in a unicast mode to a server. The 802.1AS protocol operates in a local Ethernet LAN. Whilst the IEEE1588 and 802.1AS clock sync protocols are typically link local, Dante uses Internet Protocols for media packets which are routable outside a link local network domain (e.g. Ethernet broadcast domain).

Another example is AVB transport protocols: IEEE1722 (Firewire bridging) and IEEE1733 (RTP extension for AVB). The AVB media transport protocols depend on 802.1AS, which is restricted profile of the IEEE1588 clock synchronization protocol and operates in an Ethernet LAN. IEEE1722 uses Ethernet Layer 2 media packets which are inherently link local. IEEE1733 uses RTP for media packets, which in turn are based on Internet Protocols and are routable outside a link local network domain.

IEEE1722 and IEEE1733 allow senders to transmit at any rate and send packets containing timestamps which relate signal instant to 802.1AS network time. Since the 802.1AS network time is synchronized between the sender and receiver, the receiver can use the timestamps to accurately determine the sending rate of the source and for time alignment of media signals. The receiver locks on to the senders' transmission rate using the received packet rate or preferably the 802.1AS-to-media-signal timestamps.

The IETF RTP protocols are often used for media transport on the internet (e.g. VoIP, streaming media). The IETF RTCP (RTP Control Protocol) is used in conjunction with RTP (Real-time Transport Protocol) transport protocol to provide synchronization between RTP media streams. Although RTCP contains NTP format timestamps, it is not required or implied that the sending system uses NTP to control sending or receiving rates, since it cannot be assumed that senders and receivers on the internet have coordinated clocks. RTCP uses NTP format timestamps to relate multiple RTP streams from a single source to a common time base, thus supporting time alignment between different streams with potentially different rates from the same source. RTP receivers do not use synchronized NTP time to assume a sending rate, rather receivers lock to the senders timing via the stream of packets from the sender and/or control messages containing timestamps. RTP is typically used in one of two modes of operation: file play-out: chunks of a media file are played out at a rate regulated by operating system timers and/or media signal streamed from hardware: a digitized media signal is produced by hardware, packetized and sent into the network. The sending rate is regulated by the I/O hardware. A system which coupled multiple senders and/or receiver rates using a network time protocol could employ RTP as a transport for the media signals (for example IEEE1733).

Systems like CobraNet, Ethersound or Livewire have a local clock master with a network protocol that slaves use to synchronize to the master. Senders and receivers in the network lock their local media clocks to the master clock and the rate of the master clock controls the rate of sending and reception of media signals throughout the network. The local synchronization signal provides rate control rather than time alignment and media signals can be played out at different times throughout the network (for example, when transmission path delays differ for various receivers in the network). CobraNet and Ethersound are Ethernet layer 2 protocols whereas Livewire can operate at layer 3 in a routed multicast IP network.

The "media network domains" spanned by the various methods for distributing synchronization signals include networks with the following topologies: an Ethernet LAN, a single Virtual LAN (VLAN) contained in a switched Ethernet network supporting multiple logical Ethernet LANs, a routed IP multicast campus, a collection of unicast IEEE1588 slaves connected to a master via a network, possibly via IP routers, and/or a logical synchronization domain produced by mechanisms in the clock synchronization protocol, for example the IEEE1588 domain mechanism allows multiple synchronization domains to coexist on one LAN.

The disclosure devices, methods, systems and/or computer-readable media may be used for the transmitting and/or receiving of a variety of digital media packets. For example, digital media packets that may be transmitted and/or received include, but are not limited to audio channels, video channels, lighting instructions or combinations thereof, within a media network. Other various forms of control may also be isochronous. For example, but not limited to, performance data like MIDI, OSC or lighting control data. In certain aspects, control data may need to be sequenced accurately (e.g. coordinated routing changes, coordinated switching of presets in several network connected boxes).

Figure 2:
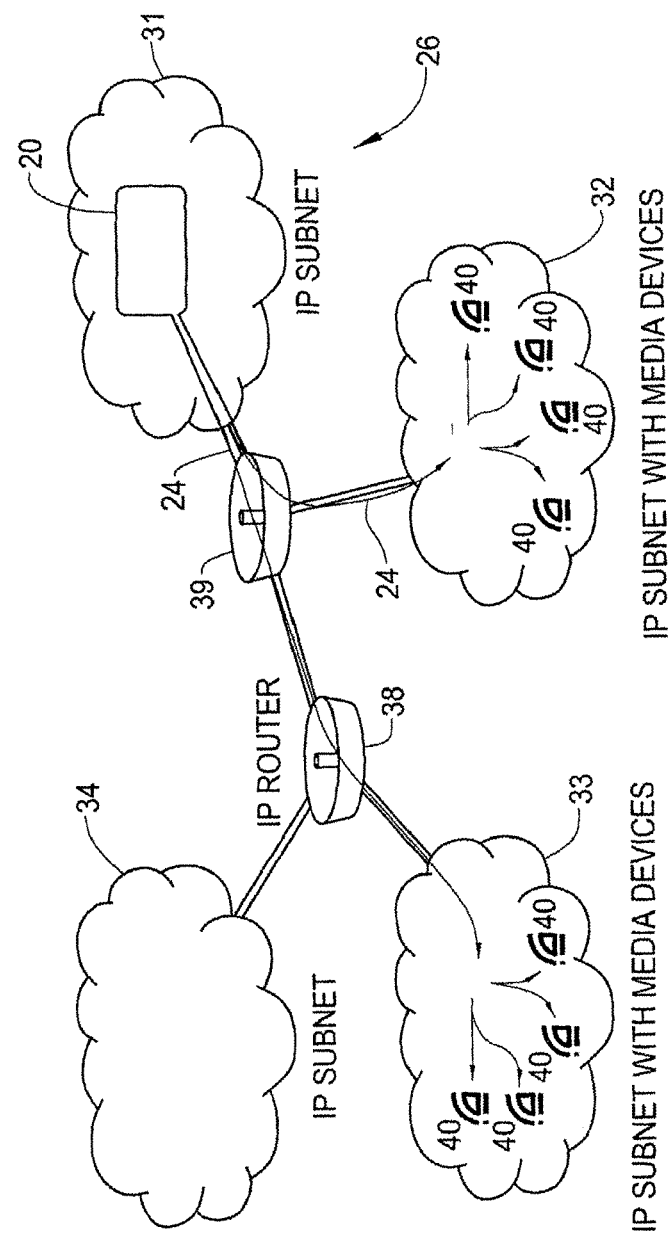
FIG. 2 is a schematic diagram of the clock synchronisation relationships between a master clock device and media devices in a routed IP network in accordance with certain embodiments.

An example of the network device in accordance with certain embodiments is schematically shown in FIG. 1. This shows that the input to the master clock device 20 is a digital audio clock signal 22, for example, an AES Word Clock provided from the output of a mixing console (not shown). External synchronization options may include any form of inputs and outputs, such as an AES or other word clock, other audio or video signals, or a combination thereof. In FIG. 2, the digital audio signal 22 is provided to an input port (not shown) of 25 the network device 20, such as by direct cable. The device 20 also includes a processor to convert the received digital clock audio signal 22 to a master clock signal 24 that is made available to media devices connected to the routed IP network 26 which the device 20 is a part of. The master clock signal 24 provides the time in seconds or nanoseconds using a network time protocol such as IEEE 1588, NTP, and 802.1AS. The master clock signal 24 may provide a master clock to a network having an inferior clock or may be replaced by, or slave over to, a master clock from a network having a superior clock as discussed further below with reference to FIG. 3. Also, the master clock signal 24 may be provided in a Gigabit network link and Differentiated Services Code Point (DSCP) Quality of Service (QoS) for high quality network clocking. Further embodiments of a master clock device 20 in the form of a clock synchronization server are also discussed below with reference to FIG. 9. The master clock device 20, or network device, is an infrastructure device that provides network services to other devices, such as other network devices and media devices, used throughout multiple networks. These multiple networks may include multiple Internet Protocol (IP) subnets and may be connected by IP routers as described below with respect to FIG. 2. The master clock device 20 distributes clock synchronization information throughout routed IP networks.

An embodiment showing a routed IP network 26 is schematically shown in FIG. 2. This network includes four sub-networks 31, 32, 33 and 34 each having a different IP subnet that are connected using IP routers 38 and 39. Sub-networks 32 and 33 each comprise four media devices 40 that are able to either transmit or receive digital media packets. Using the routers 38 and 39 connecting these media devices 40, the media devices 40 are able receive the master clock signal 24 provided by the network device 20. An example of such a network is a large production facility with many audio devices in different locations. In embodiments, the routed IP network 26 is expanded to a large network with many network devices 20 each accommodating as many of 500 or more media devices 40, creating a hierarchical collection of sub-networks.

The network device 20 enables synchronization of large scale networks (e.g., Dante) by supporting clock synchronization in networks with multiple IP subnets. The network device 20 enables Dante networking in enterprise networks, campus networks and even in wide area networks. The network device provides a high quality master clock device for Dante networks. In addition to being able to be used with routed IP networks, the network device 20 may also be used as a dedicated clock master for non-routed networks.

During synchronization of networks 31-34, the network device 20 communicates with media devices 40 having audio receivers and transmitters that support routed IP networks. Embodiments include media devices 40 having firmware with IP routing support having features such as directing unicast audio flows to IP routers, accommodating subnet clock masters slaving from a network device 20 located elsewhere in the network, and registering service discovery records in a network device 20 in addition to announcing them on the local network. Following sychronization of networks 31-34, media transport is provided by unicast or multicast audio flows traveling through the networks 31-34 from one media device 40 to another media device 40 without passing through the network device 20.

These media devices 40 use a network time protocol, such as IEEE1588 Precision Time Protocol or Network Time Protocol (NTP), to synchronise their local clocks to the received master clock signal. In this example of FIG. 2, to provide the widest possible support for routed networks, the clock synchronisation protocol uses unicast packets.

In embodiments, high speed hardware routing/switching equipment is preferable. Low end routers that forward packets by copying them from one interface to another in software will have poor performance and will drop or jitter packets unacceptably. Routers with gigabit interfaces may forward packets in hardware. Unicast and multicast routing is managed in the usual way for IP networks. A network may be configured statically or dynamically using a routing protocol such as Open Shortest Path First (OSPF) or Enhanced Interior Gateway Routing Protocol (EIGRP) for unicast, and a routing protocol such as Protocol-Independent Multicast (PIM) or Distance Vector Multicast Routing Protocol (DVMRP) for multicast. Other available routing protocols that are compatible with the routing equipment selected may also be used for unicast or multicast. In embodiments, network devices 20 may send and respond to the appropriate Internet Group Management Protocol (IGMP) queries that enable multicast routing and tree pruning to occur.

Figure 3:
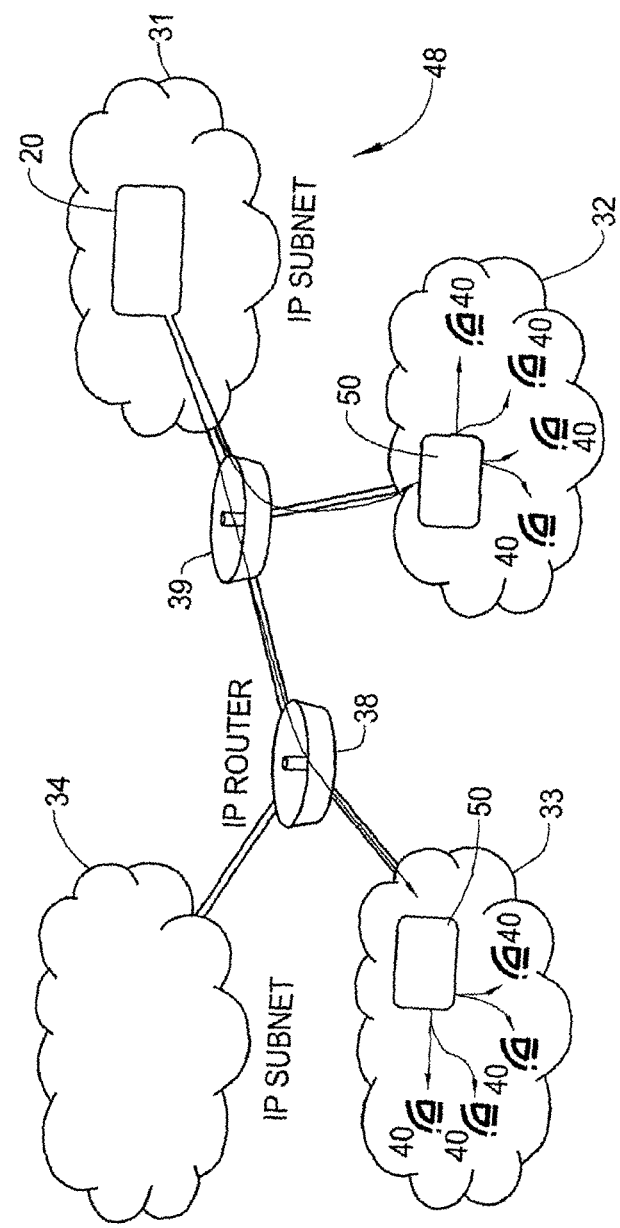
FIG. 3 is a schematic diagram of the hierarchical clock synchronisation relationships between a first network device and a second (slave) network device in a routed IP network in accordance with certain embodiments.

The network 48 may also include multiple network devices 20 as shown in FIG. 3. Here the sub-networks 33 and 32 each comprise a further slave network device 50 that are each able to receive the master clock signal 24 from the device 20 using unicast. This creates a hierarchy, with the slave network devices 50 slaving from the device 20. The master clock signal 24 input to the network devices 50 provides a network time protocol version of the digital audio clock signal 22 input to device 20. The slave network devices 50 then provide a further master clock signal. Using multicast, only the media devices 40 within the same sub-net are able to receive this further master clock signal (not signal 24 from device 20) to synchronise their local clocks. In this manner, each network device 20 may operate as a master clock device for other per-subnet network devices 20 in the network 26. In addition, each network device 20 may be an IEEE1588 master clock for its local subnet 31-34. A network device 20 may also act as a master clock device for another network device 20, supporting a hierarchical clock distribution tree. Also, network devices 20 may serve different Domain Name System (DNS) domain names, again supporting hierarchical delegation of service discovery across multiple network devices 20. In certain embodiments, if a local clock signal in the slave network device 50 provides rate information only (e.g., in CobraNet) then synchronization of the local clock may not be required, however, the master clock signal 24 received from the network device 20 may still be used for synchronization. Also, the master/slave relationship between network devices 20 need not be strictly one-to-one, as discussed further below regarding FIG. 5, since multi-master clock synchronization protocols such as NTP may be utilized which use several masters simultaneously to improve synchronization accuracy, or multiple masters may be used to provide robustness in the face of clock master failure.

Figure 5:
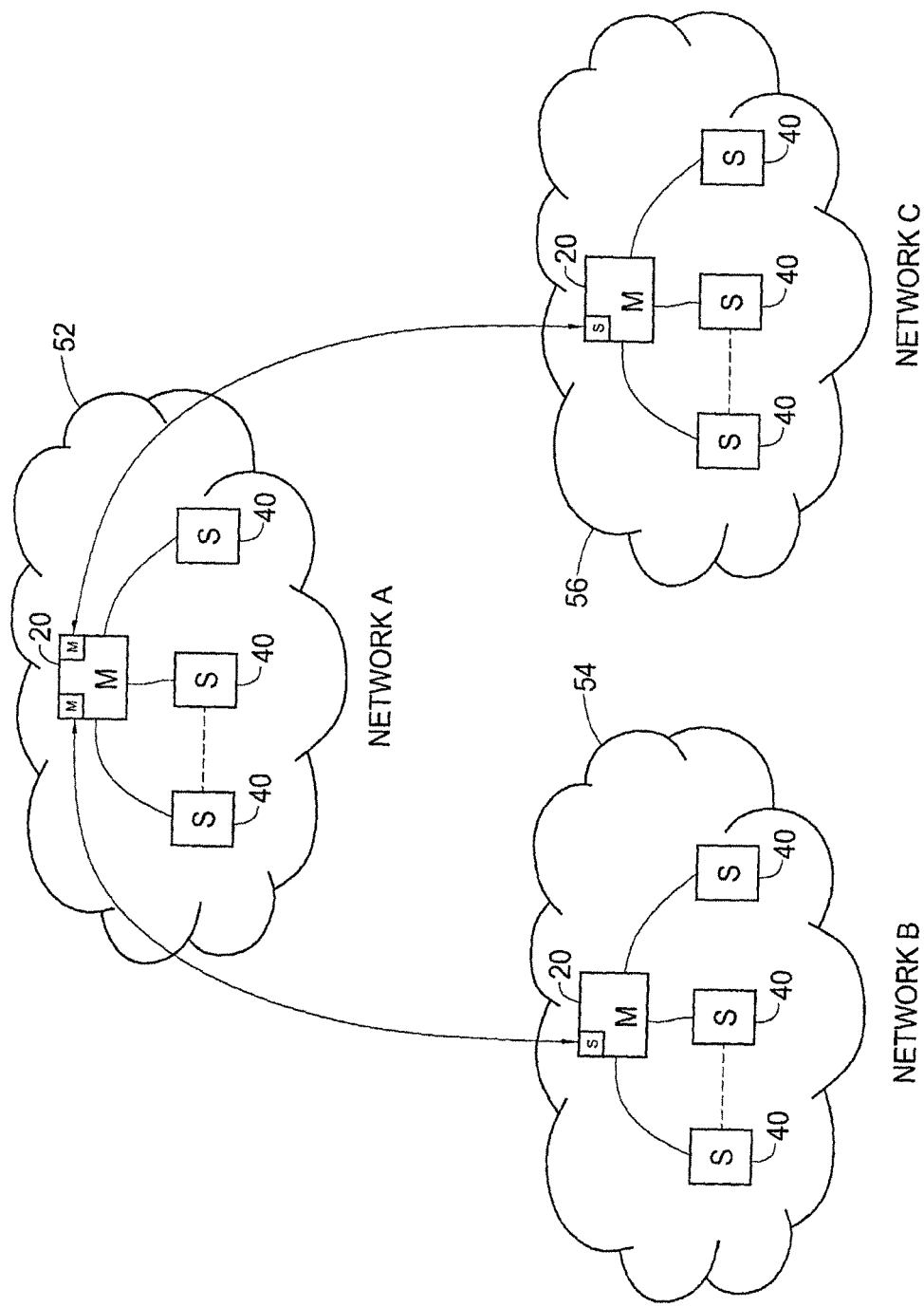
FIG. 5 is a schematic diagram of the clock synchronisation relationships between a plurality of media devices in and slave devices network in accordance with certain embodiments.

The network 48 may comprise various local media networks requiring synchronization using a network time protocol. In certain embodiments, this network 48 may include, e.g., a routable IP network, a wide area network, a set of Virtual Local Area Networks (VLANs) in a switched Ethernet network, or a single LAN shared by different isochronous media networking technologies such as shown in FIG. 5 described below. A network device 20 acting as a local clock master in such a network 48 may slave to a network device 20 acting as a local clock master in another network domain (e.g., via unicast, IEEE 1588 or NTP), a Global Positioning System (GPS) signal or other reference signal providing a shared clock course for all domains, or a synchronization server accessible via the network (e.g., via unicast IEEE 1588 or NTP).

Figure 4:
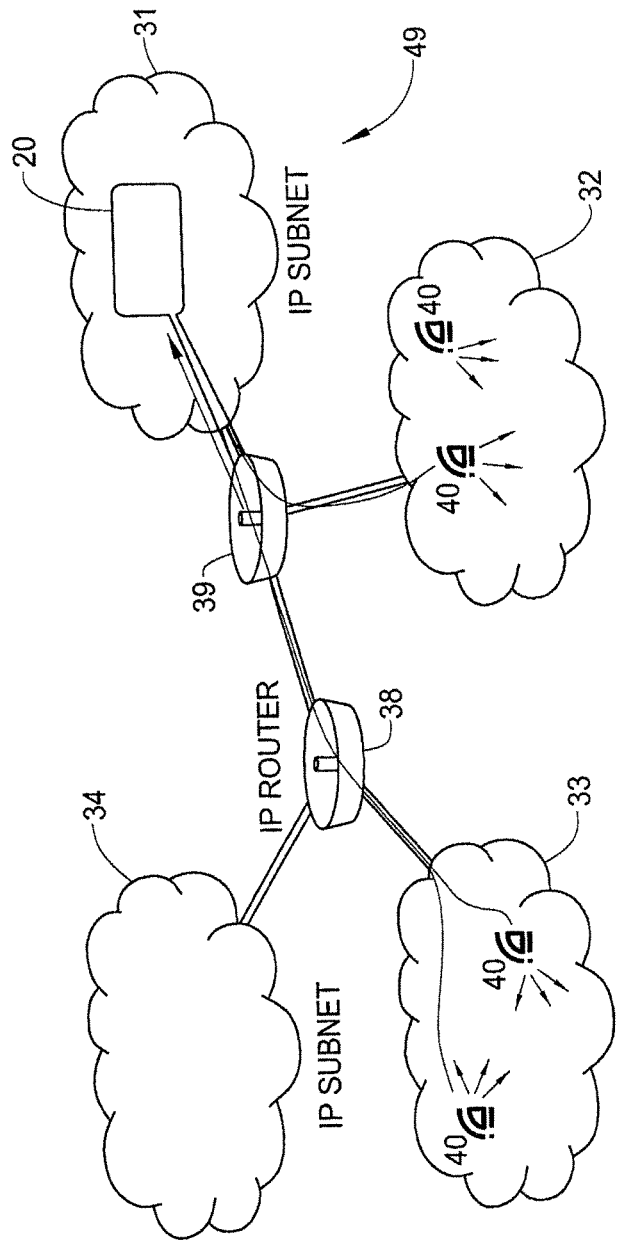
FIG. 4 is a schematic diagram of the service discovery relationships between a master clock device and media devices in a routed IP network in accordance with certain embodiments.

The service discovery function of the device 20 will now be described with reference to FIG. 4. In this network 49, in addition to clocking, the network device 20 also supports service discovery of media devices and channels by acting as a repository for the media devices and channel information. The device 20 includes storage means to store this information, such as a removable flash storage. Media devices 40 register on the network 49 by storing their information, such as name and channels available, in the repository using DNS Dynamic Updates (DDNS). If a media device 40 wishes to discover a media device 40 not in their sub-network, the media device 40 retrieves information from the repository of the device 20 using normal unicast DNS lookups. In embodiments, the network device 20 may include a DNS server supporting Dynamic DNS Updates, storing service discovery records such as DNS Resource Records and facilitating DNS Service Discovery (DNS-SD) in routed IP networks to provide seamless integration with media devices 40. The media devices 40 within the same sub-network 32 or 33 continue to advertise and discover media channels locally using multicast. Alternatively, or in addition these media devices 40 can also use unicast locally.

Referring back again to FIG. 3, media devices 40 in a routed network must be configured with a variety of information including the information needed to locate and use the device 20 as a clock master and for service discovery. This information is provided to each media device 40 in an IP network via the Dynamic Host Configuration Protocol (DHCP). Alternatively, routing information may be provided by Multicast Address Dynamic Client Allocation Protocol (MADCAP), or other routing protocols available.

In this example the slave network devices 50 are capable of providing configuration information to their local media devices 40 via DHCP. This greatly simplifies the network management, since it can automatically supply the correct information needed by the media devices 40 to access clock synchronization and service discovery services.

In embodiments, the network device 20 may operate at a DHCP server, providing simple configuration and management of media devices 40 in the network 26. DHCP supplies the configuration information such as one or more of an IP address, subnet mask, default route, DNS domain name, IP addresses for DNS servers in the network, and IP addresses for network devices 20 operating as a clock masters that are available in the network 26. During synchronization, the DHCP configuration may indicate that network devices 20 operating as clock masters for a subnet 31-34 may become slaves 50 of the network device 20 clock master.

The media devices 40 may use the DNS domain name and DNS server IP addresses to locate the network devices 20 that should be used to register service discovery records. The DNS server running on the supplied IP address(es) may be the correct network device 20 for a given domain name, or it may reference to a different network device 20. In the latter case, the media devices 40 resolve audio routes (e.g., subscribe to mic@preamp.sydney.audinate.com) and pass through a DNS delegation tree to locate the appropriate network device 20 containing the necessary service discovery records. The multicast address allocation range used for multicast audio flows is then provided to each media device 40 in the routed IP network 26 by the DHCP server. The network device 20 and slave network device 50 also provides configuration backup and recovery via removable flash storage. Restoring audio network configuration for a damaged network device 20 or 50 is simply a matter of inserting the removable storage into a new network device 20 or 50 as appropriate and powering on. Configuration backup and recovery may be controlled by one or more of physical controls such as switches or knobs, Internet or software-based control commands, audio signaling such as test tones, external devices such as an optional DHCP server, or any other hardware or software control mechanism available.

In embodiments, a wide variety of network security techniques from known IP networking technology may be applied to large scale media devices 40 in an audio network. These security techniques include controlling access to the physical network; authenticating access to network ports and/or VLANS (e.g., MAC addresses or versions of IEEE 802.1); Firewalling or Access Control Lists; Internet Protocol Security (IPsec) protection of audio, clocking and other traffic; and Authentication of Dynamic DNS updates. Specific security scenarios may be addressed using a combination of the above techniques. Some of these techniques may require support in proprietary products (e.g., IPsec and DDNS authentication), while others may require support from other network equipment (e.g., versions of IEEE 802.1 or Access Control Lists).

In FIG. 5, the network device 20 in network 48 described above with respect to FIG. 3 includes multiple network devices 20 spread throughout a plurality of networks 52, 54, 56. Networks A-C (52, 54, 56) each comprise an isochronous media network within a LAN, although any number of networks may be included. A network device 20 in Network A (52) communicates with devices 20 in Networks 13 (54) and C (56). Also, each of the network devices 20 communicates with media devices 40 within the same network 52, 54, 56. In an embodiment, a dedicated clock synchronization server (not shown) may also communicate with one or more network devices 20 such as network device 20 in Network A (52) using the unicast mode of IEEE 1588. Communications comprise synchronization information in the form of a master clock signal 24 transmitted from one network device 20, and/or from a dedicated clock synchronization server, to another network device 20 in a different one of Networks A-C (52, 54, 56). The receiving network device 20 then provides a further master clock signal to media devices 40 within the same network.

An exemplary embodiment showing the transmission of media packets between media devices 40 will now be described with reference to FIG. 6. Once one or more isochronous media networks are synchronized, transmission of media signals between them is possible. Conceptually, a larger isochronous media network is formed which is the aggregate of the synchronized local media networks LANs 59 and 61 in combination with routers 60, 62, 64 and a synchronization source 58. LANs 59 and 61 may be connected to other local networks by an internetwork. In some embodiments, a routed TCP/IP network is used to connect LANs into a larger network, so it is desirable that local media networks of various types can be connected together using a routed TCP/IP network. In such a case, the sender in one network domain and the receiver in a different network domain may use IP protocols and share a common media encoding (e.g., Linear PCM, MPEG-2, H.264, etc.). The media packets can travel from the sender 40A to the receiver 40B over the network connection between the network domains, forwarded by routers 60, 62, 64. Media packets need not be intercepted or processed by a network device 20 in order to be transferred between network domains.

Figure 6:
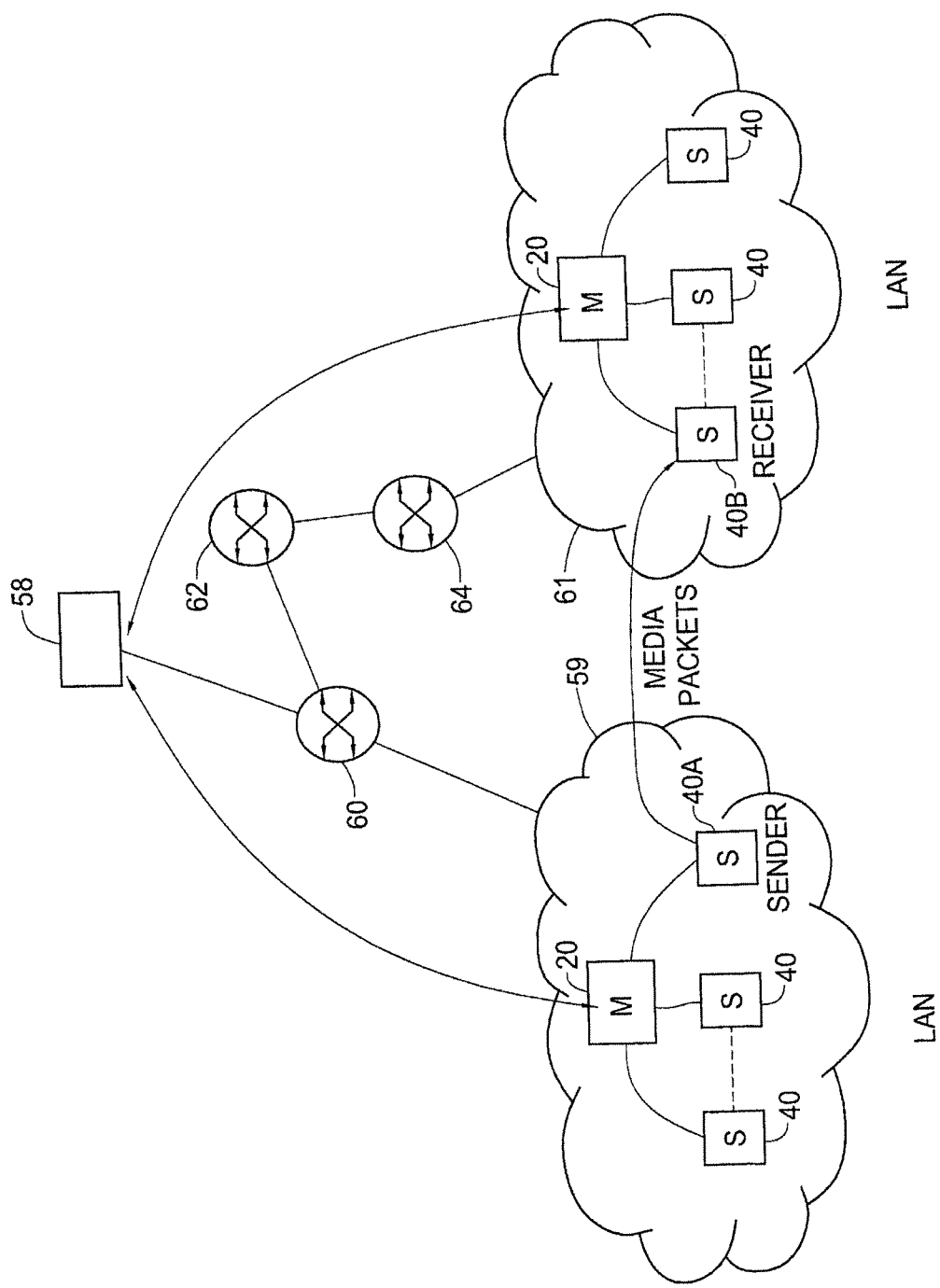
FIG. 6 is a schematic diagram of the clock synchronisation relationships between a plurality of media devices in and slave devices in multiple networks in accordance with certain embodiments.

Routable media transport protocols that may be used with the exemplary embodiment described in FIG. 6 include, e.g., Dante, RTP, and IEEE1733 extension of RTP. Some types of isochronous media networks, however, do not use routable protocols. Examples of non-routable protocols include CobraNet, Ethersound, IEEE1722, Firewire/IEEE1394 or combinations thereof. Media packets transmitted using non-routable protocols often are not transmitted directly over an internetwork connecting local media networks. In order to enable media signal transport over the internetwork, media packets from a non-routable protocol may be encapsulated or tunneled in a routable protocol. This may be possible for some simple transport (e.g., an Ethersound daisy chain), however other protocols have additional restrictions; which make this approach difficult. For example, CobraNet expects that the delay through the network is bounded to under 5.33 ms and schedules packet transmissions in tightly defined time slots to an accuracy of tens of microseconds. This can present challenges for local Ethernet LANs let alone a tunneled network with additional delays.

Figure 7:
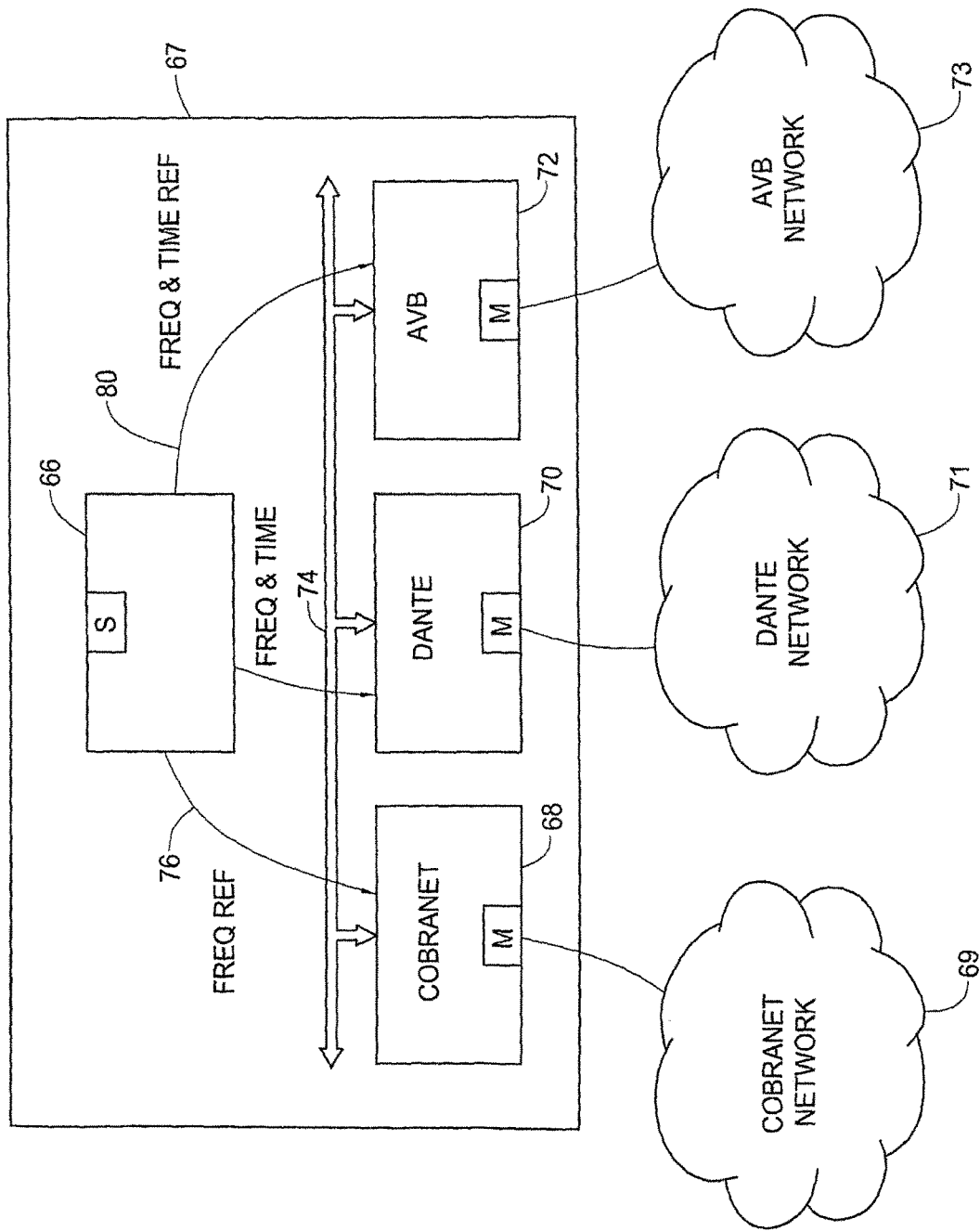
FIG. 7 is a schematic diagram of the relationships between a plurality of networks coupled to a common network device by a data bus in accordance with certain embodiments.

Exemplary embodiments showing isochronous media networks not using routable protocols will now be described with reference to FIG. 7. In FIG. 7, a receiving device 67 in one isochronous network 69 receives media signals at an interface 68 using a local non-routable media networking transport (e.g., CobraNet), and then transmits the media signals at an interface 70 using a different, routable media networking protocol (e.g., Dante) to another local network 71. Similarly, an Audio Video Bridging (AVB) network 73 may interface with a compatible AVB interface 72 within the receiving device 67. The receiving device 67 also includes a bus, or backplane, 74 for communicating media signals between the interfaces 68, 70, 72. The bus 74 may be implemented in a proprietary fashion or with existing technologies such as IEEE 1394 or USB. Frequency and/or time reference signals 76, 80 may be provided by a synchronization source 66 to the interfaces 68, 70, 72 to provide time information to those protocols which need it as well as frequency information via the local synchronization signal.

The embodiments described above with respect to FIG. 7 may be implemented using plug-in cards for interfaces 68, 70, 72 which implement different isochronous media networking technologies, and which can receive synchronization information from a synchronization source 66 using a network time protocol. Each interface 68, 70, 72 can be a master for corresponding local isochronous media networks 69, 71, 73 to provide synchronization information.

Figure 8:
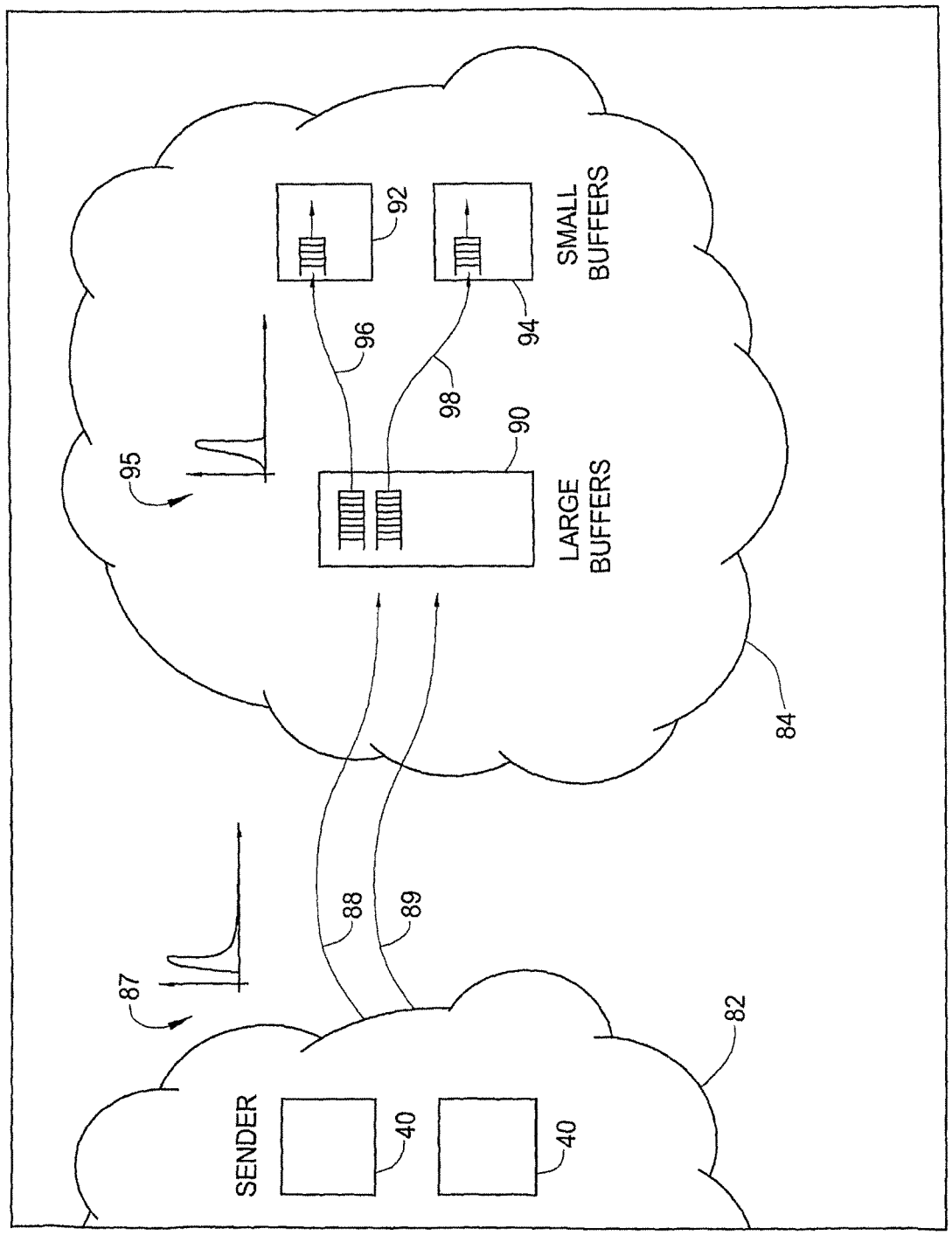
FIG. 8 is a schematic diagram of the buffering for communications from one network to another network in accordance with certain embodiments.

Exemplary embodiments showing buffering of media packets will now be described with reference to FIG. 8. Large buffers 90 are provided within a re-timer device in network 84 to accommodate received media packets from a sender 50 in network 82 via paths 88, 89 that are time-delayed as shown by delayed signal 87. The large buffers 90 in turn transmit the media packets via paths 96, 98 to small buffers 94, 96 in other devices in network 84 having sufficiently low timing jitter represented by a minimally delayed signal 95 such that buffering requirements are not exceeded. These devices having small buffers 94, 96 would likely be connected to a network that was close to the re-timing device (e.g., on the same LAN), however such proximity may not be required, e.g., if a routable media transport protocol is being used.

Re-timing functionality may be used, e.g., when crossing wide area links, when crossing line types with high delay variation (e.g., wireless 802.11b/a/g/n), with HomePlug powerline networking, or to shift cost from receivers to a buffering node (e.g., for networks containing many loudspeakers or amplifiers which typically receive one signal or a small number of signals). A re-timer may also compensate for fixed offsets in media packet timestamps between two isochronous media networks, such as described above regarding FIGS. 5-7, which may use time synchronization in addition to frequency synchronization. A re-timer may cross VLANs by being apportioned to more than one VLAN at a time such that the re-timer may be located in more than one EP subnet at a time. The re-timer box may comprise an isochronous media networking device capable of receiving a media networking protocol type different from a protocol with which it transmits, thus performing a protocol translation function as well as a re-timing function. Certain embodiments may also include additional latency methods such as those described in PCT application AU2008/000656.

Figure 9:
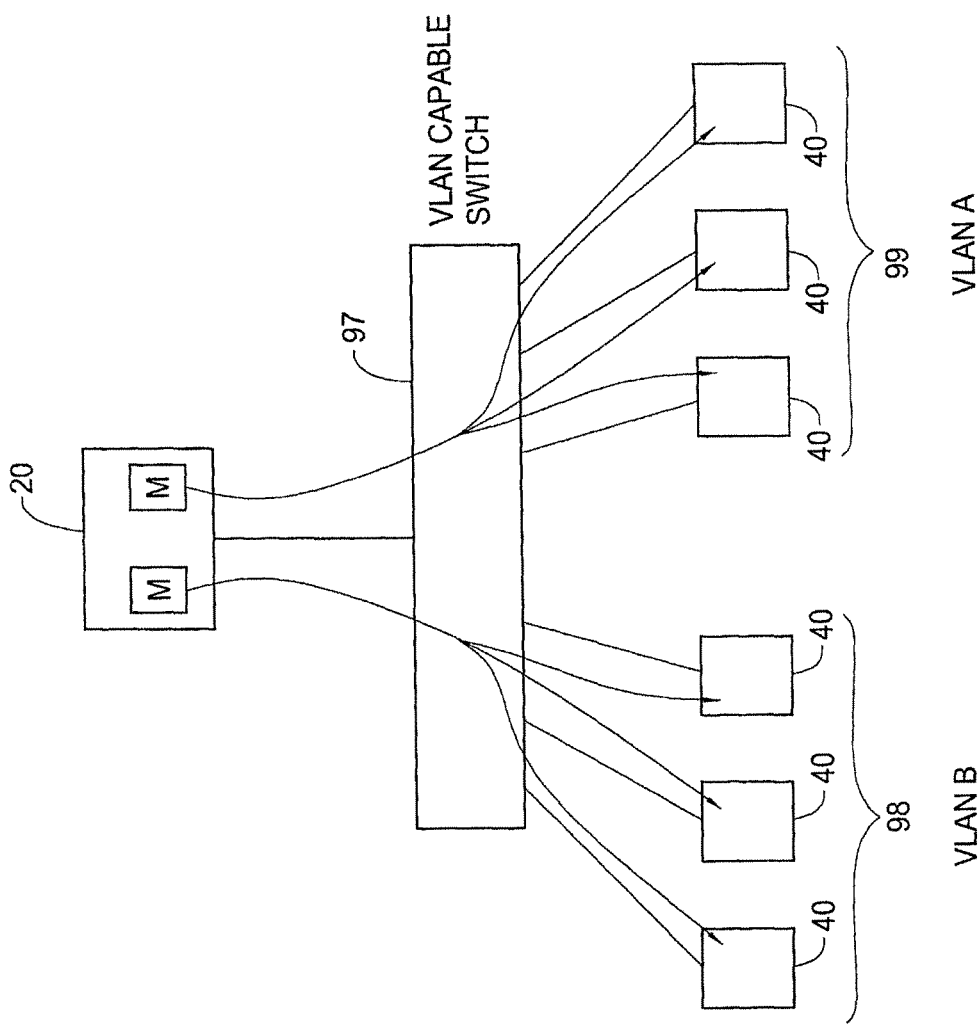
FIG. 9 is a schematic diagram of the relationships between a plurality of VLANs coupled to a common network device by a VLAN capable switch in accordance with certain embodiments.

Exemplary embodiments showing clock synchronization will now be described with reference to FIG. 9. A master clock device is shown in the form of a clock synchronization server 20 coupled to a VLAN capable switch 97, which is further coupled to media devices 40 in VLAN A (98) and VLAN B (99). The clock synchronization server 20 functions in a manner as described above with respect to the master clock device in FIG. 1. As shown, clock synchronization server 20 is capable of communicating synchronization information on multiple local network domains at the same time by use of a VLAN capable switch 97.

The clock synchronization server 20 may be a VLAN aware device operating on several logical Ethernet networks at the same time or could participate in several IEEE 1588 logical synchronization domains on the same network. Further, the clock synchronization server 20 may slave to another superior clock synchronization server (using, e.g., IEEE1588, 802.1AS or NTP), may obtain rate information from one source and absolute time information from the network time protocol, may use a reference signal as a time or rate source (e.g., GPS), may use a local synchronization signal as an input reference signal (e.g., CobraNet), may use media clock as the input reference signal (e.g., AES3 input, word clock, video black signal, ADAT sync, or other AV sync signal), and/or may be the local master for one or more local media networks that can employ the same or different local synchronisation signals (e.g., CobraNet and IEEE1588). In certain embodiments, the clock synchronization server 20 functionality may be integrated into one or a combination of a standalone synchronization server device, a local master clock for one or more isochronous media networks, a network switch or router, and a media device in an isochronous media network.

Figure 10:
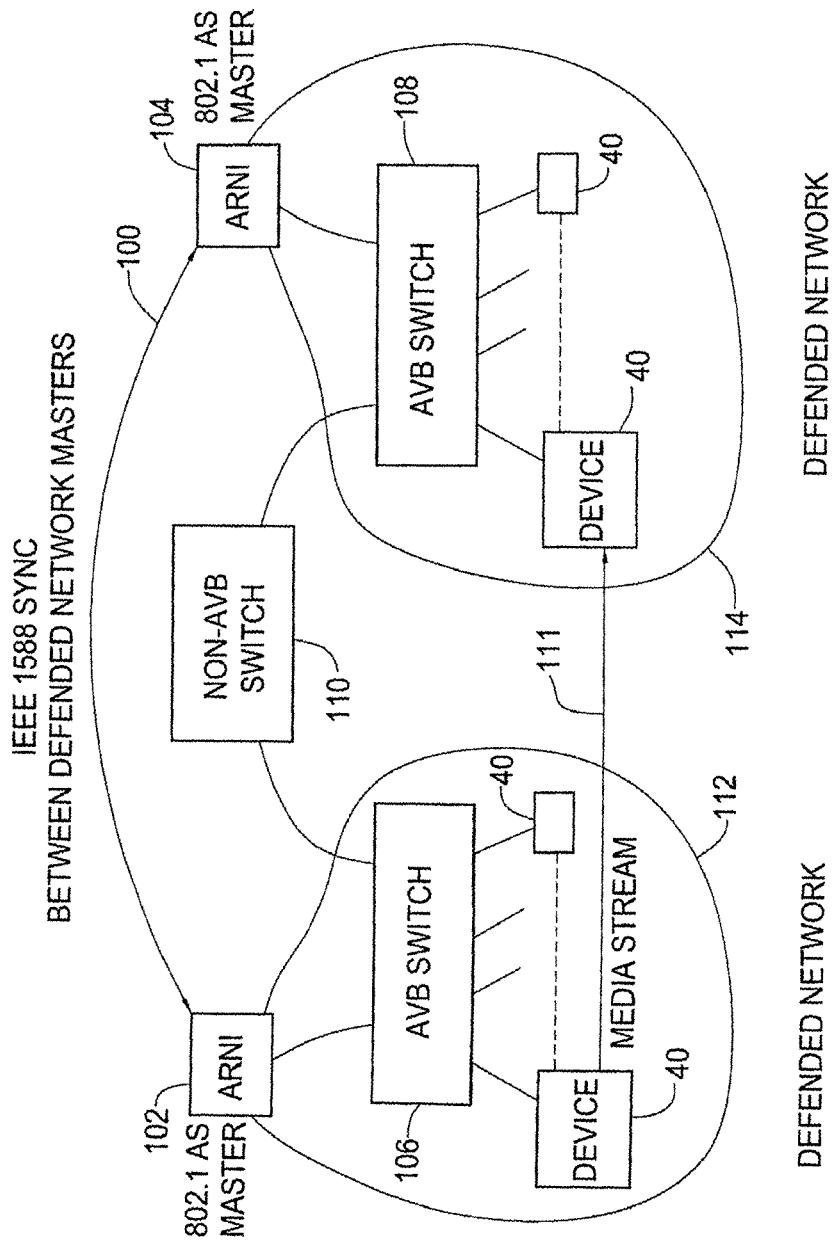
FIG. 10 is a schematic diagram of the relationships between a two defended networks coupled by an IEEE1588 synchronisation and Non-AVB switch in accordance with certain embodiments.

Exemplary embodiments showing the integration of Audio Video Bridging (AVB) will now be described with reference to FIG. 10. Ethernet AVB is a set of standards from IEEE for audio-video networking in an IEEE 802 LAN. AVB builds defended networks such as networks 112, 114 hop-by-hop to exclude non-AVB compatible equipment such as non-AVB switch 110. The presence of the non-AVB switch 110 in the network partitions the network into one or more isochronous network islands, i.e., defended networks 112, 114. A timestamp taken from one network 112 and transmitted to another network 114 via an AVB transport protocol like IEEE1722 or IEEE1733 is not meaningful in the other network 114 since it is taken with respect to a 802.1as time local to the sending network which is not accessible to the device in the receiving network. The AVB transport protocols assume a single shared 802.1as clock spanning the network connecting all senders and receivers. Device 102, however, is able to communicate synchronization information to device 104 via IEEE 1588 synchronization signaling 100. The synchronization signaling 100 enables AVB switch 106 to reach AVB switch 108 without relying upon the non-AVB switch 110 to transfer synchronization information. By bridging clock synchronization 100 across switches 106, 108 that do not directly participate in 802.1AS AVB clock synchronization 100, thereafter isochronous media transport 111 is able to occur between the devices 40 of two isochronous networks 112, 114, over a non-AVB network switch 110.

Figure 11:
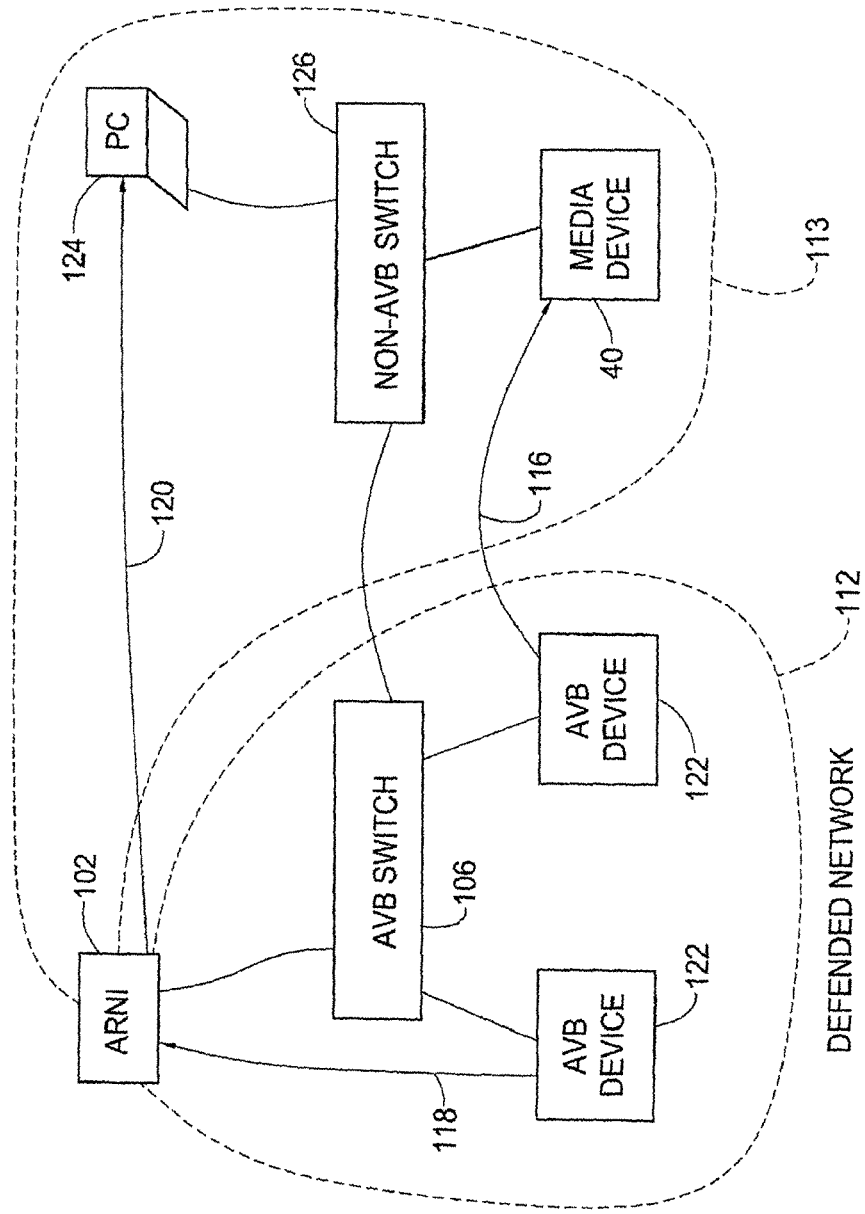
FIG. 11 is a schematic diagram of the relationships between a defended network and another network coupled by an AVB switch and a Non-AVB switch in accordance with certain embodiments.

Exemplary embodiments showing the interfacing of legacy equipment to an AVB network will now be described with reference to FIG. 11. As shown, a legacy system 113 includes a media device 40 coupled to a non-AVB switch 126 further coupled to a device 124 such as PC equipment (hereafter "PC 124"). A defended network 112 includes AVB devices 122 attempting to transfer media packets to the media device 40 of the legacy system. The defended network 112 also includes an AVB switch 106 coupled to a network device 102.

In order for the media devices 122 of the defended network 112 to transfer media packets to the media device 40 of the legacy network 113 comprising a non-AVB switch 126, one or more of the devices 122 sends a signal 118 to the network device 102 which in turn transmits a synchronization signal 120 using standard IP protocols to PC 124 in the legacy network 113, The synchronization signal 120 received enables the PC 124 to configure the non-AVB switch 126 to receive communications from the AVB switch 106 of the defended network 112. Thereafter, the AVB devices 122 may send media packets 116 to the media device 113 in the legacy network 113 vi AVB switch 106 communicating with non-AVB switch 126.

It will be appreciated by persons skilled in the art that numerous variations and/or modifications may be made to the invention as shown in the specific embodiments without departing from the scope of the invention as broadly described. The present embodiments are, therefore, to be considered in all respects as illustrative and not restrictive.

The invention claimed is:

1. A method of synchronizing a plurality of media devices in a network consisting of an aggregation of one or more local media networks using at least one synchronization signal, said method comprising:
 receiving said at least one synchronization signal from a master clock device at one or more media devices in said network;
 sending and/or receiving media signals from at least one media device located in a first isochronous local media network to/from at least one media device in a second isochronous local media network such that the media signals pass from the first isochronous local media network to the second isochronous local media network, said sending and/or receiving comprising locating and using the master clock device as a clock master, wherein the master clock device stores media device and channel information in a repository;
 wherein the media device in the first isochronous local media network uses a discovery service to discover devices, media channels and/or other information associated with the media devices in the second isochronous local media network; and
 wherein the synchronization signals coordinating transmission in the first isochronous local media network and the second isochronous local media network are rate synchronized and time aligned to allow the at least one media device located in a first isochronous local media network and the at least one media device located in the second isochronous local media network to match their transmission and reception rates to ensure error free, or substantially error free transmission of the media signals between the first and second media networks.

2. A method as recited in claim 1, wherein said method includes the further steps of: receiving said synchronization signal at a network device; and transmitting said synchronization information from said network device.

3. A method as recited in claim 1, wherein said network device is a slave network device that synchronizes with said network using said synchronization signal from said master clock device.

4. A method as recited in claim 1, wherein said synchronization signal comprises at least one of IEEE 1588, NTP, IEEE 802.1AS or other versions of IEEE 802.1, and any other network time protocol.

5. A method as recited in claim 1, wherein said media transport protocol comprises at least one of Real-time Transport Protocol (RTP), Dante, an IEEEI 733 extension of RTP, and any other routable transport protocol.

6. A method as recited in claim 1, wherein said network comprises at least one of a local area network (LAN), a virtual local area network (VLAN), one or more IP subnets, a CobraNet network, a Dante network, an Audio Video Bridging (AVB) network, and a wide area network (WAN).

7. A method as recited in claim 1, wherein at least one media device in a first network is capable of sending and/or receiving synchronization information to at least one media device in a different network such that the media devices are capable of matching transmission and reception rates so that receiver underrun and/or overrun is prevented, substantially prevented, or acceptable.

8. A method as recited in claim 1, wherein at least one media device in a first network is capable of sending and/or receiving media signals to another media device in a different network such that the media signals are able to pass from one network to at least one other network.

9. A method as recited in claim 1, wherein media packets are routed, forwarded, tunneled, translated, and/or received and retransmitted from one media network so that the media signal the media packets contain can be conveyed to another media network and received as a stream of media packets.

10. A method as recited in claim 1, wherein a media device on one network can use a discovery service to discover devices, media channels and/or other information associated with the media devices in another media network.

* * * * *